(12) United States Patent
Williams

(10) Patent No.: US 8,310,218 B2
(45) Date of Patent: Nov. 13, 2012

(54) TIME-MULTIPLEXED-CAPACITOR DC/DC CONVERTER WITH MULTIPLE OUTPUTS

(75) Inventor: Richard K. Williams, Cupertino, CA (US)

(73) Assignee: Advanced Analogic Technologies, Inc., Santa Clara, CA (US)

( * ) Notice: Subject to any disclaimer, the term of this patent is extended or adjusted under 35 U.S.C. 154(b) by 455 days.

(21) Appl. No.: 11/835,760

(22) Filed: Aug. 8, 2007

(65) Prior Publication Data
US 2009/0039947 A1 Feb. 12, 2009

(51) Int. Cl.
*G05F 1/40* (2006.01)
(52) U.S. Cl. ........................................................ 323/265
(58) Field of Classification Search .................. 323/265, 323/268, 273, 282, 351; 327/530, 536, 537; 363/63
See application file for complete search history.

(56) References Cited

U.S. PATENT DOCUMENTS

| | | | | |
|---|---|---|---|---|
| 4,849,662 A * | 7/1989 | Holberg et al. | ............... | 327/554 |
| 5,175,749 A * | 12/1992 | Ficht et al. | ...................... | 375/319 |
| 6,903,535 B2 * | 6/2005 | Liu et al. | ........................ | 323/222 |
| 7,436,163 B2 * | 10/2008 | Katoh | ............................ | 323/285 |
| 2006/0066389 A1* | 3/2006 | Wardle | ........................... | 327/536 |
| 2009/0326624 A1* | 12/2009 | Melse | ............................ | 607/116 |

* cited by examiner

*Primary Examiner* — Adolf Berhane

(57) ABSTRACT

A multiple output DC-to-DC voltage converter using a new time-multiplexed-capacitor converter algorithm and related circuit topologies is herein disclosed. One embodiment of this invention includes a flying capacitor, a first output node, a second output node, and a switching network. The switching network configured to provide the following modes of circuit operation: 1) a first mode where the positive electrode of the flying capacitor is connected to an input voltage and the negative electrode of the flying capacitor is connected to ground; 2) a second mode where the negative electrode of the flying capacitor is connected to the input voltage and the positive electrode of the flying capacitor is connected to the first output node; and 3) a third mode where the positive electrode of the flying capacitor is connected to ground and the negative electrode of the flying capacitor is connected to the second output node.

28 Claims, 30 Drawing Sheets

Fig. 5
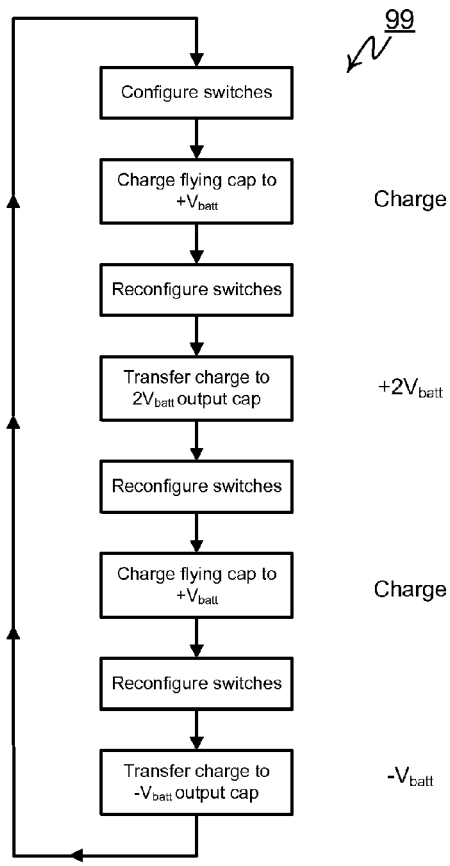
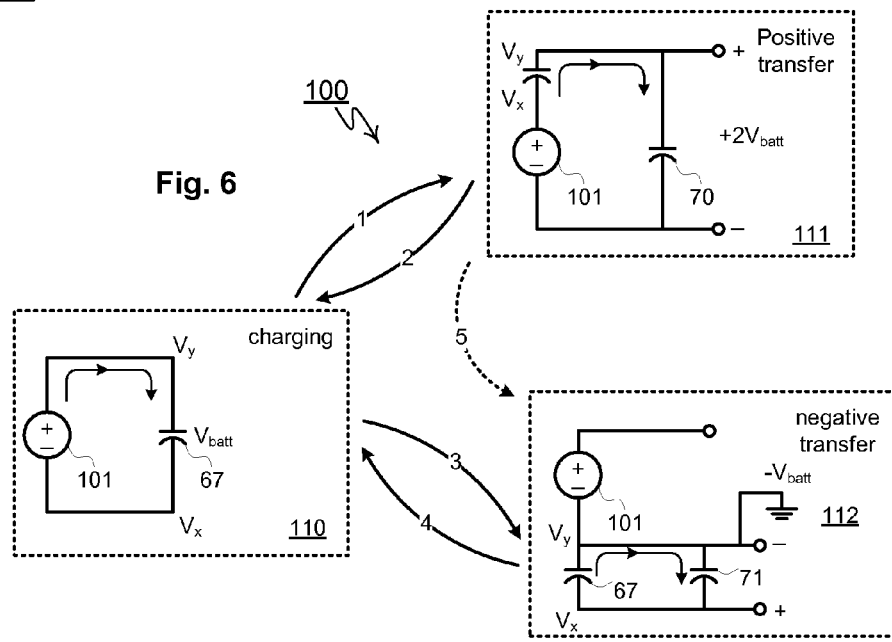
Fig. 6

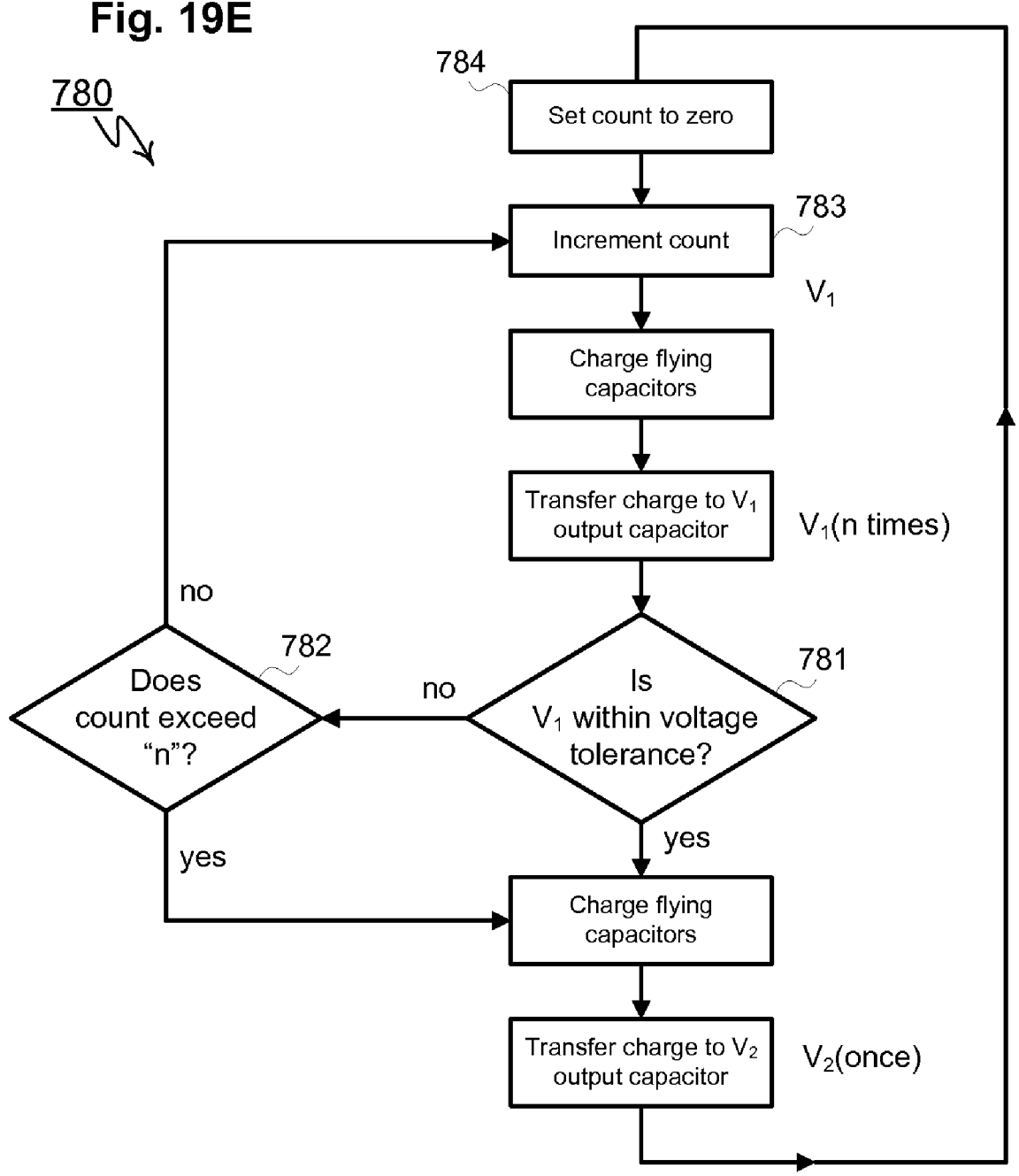

TIME-MULTIPLEXED-CAPACITOR DC/DC CONVERTER WITH MULTIPLE OUTPUTS

BACKGROUND OF THE INVENTION

Three approaches are commonly employed in implementing DC-to-DC converters—electronic circuits that converts a battery or DC voltage source to a different DC voltage. These methods comprise linear regulation, inductive switching regulators or so-called "switch-mode power supplies," and switched capacitor converters, also known as charge pumps. Of these methods, the charge pump is valued for its simplicity, cost effectiveness, and relatively low noise operation. Under certain circumstances, the charge pump can operate at high conversion efficiencies, but not over the wide range of conditions that switched inductor based converters can achieve.

The operating principle of a charge pump is straight forward comprising a charging phase and a charge transfer phase which operate in alternating sequence. As shown in FIG. 1A, prior art charge pump doubler type circuit 1 comprises four MOSFETs, a flying capacitor not attached permanently to any specific supply voltage, and a grounded output filter capacitor. In the charging phase, battery-connected MOSFET 3 and grounded MOSFET 2 are turned on and allow conduct current and charge capacitor 5, electrically connecting the capacitor in parallel with the battery or voltage input to the circuit. MOSFETs 1 and 4 remain off during the charging phase of operation. This charging current is indicated in the schematic 1 by a dashed line and arrow. After some time, capacitor 5 charges to a voltage equal to the battery voltage $V_{batt}$ and the charging current subsides.

During the charge transfer phase, capacitor 5 is connected in series with the battery, specifically with its negative terminal shorted to the positive terminal of the battery achieved by turning on MOSFET 1. The voltage of the series combination of capacitor 5 stacked atop the battery input has a voltage of $V_{batt}+V_{batt}=2V_{batt}$, or twice the battery voltage, hence the name "doubler" ascribed to this charge pump. This series circuit is simultaneously connected to output capacitor 6 by turning on MOSFET 4. Capacitor 5 then transfers its charge to output capacitor 6 until $V_{out} \rightarrow 2V_{batt}$ as shown by the solid line and arrows.

After the initial charging of output capacitor 6, the charge pump's operation becomes efficient since the only current flowing is that needed to replenish the charge lost on output capacitor 6 supplied to the load. As long as the desired output voltage is twice that battery voltage, i.e. $2V_{batt}$, the efficiency of doubler charge pump 1 is high, even up to 98%. Any deviation between the actual output voltage $V_{out}$ and the charge pump's ideal output $V_{CP}=n \cdot V_{in}$ will result in a loss of efficiency as given by the relation $$\eta = \frac{V_{out}}{V_{CP}} = \frac{V_{out}}{n \cdot V_{in}}$$

The voltage differential between the charge pump lowers efficiency by causing one of the transistors to saturate a drop the incremental business. One common condition leading to lower efficiency in a doubler charge pump is "over-pumping" the output to a voltage higher than desired or required by the load.

Fractional Charge Pump Implementation: A common solution is to over-pumping is to employ a fractional charge pump, one that steps up by 1.5× rather than doubling its input. Such a fractional charge pump 20 as shown in FIG. 1B requires two flying capacitors 30 and 32, controlled by a matrix of MOSFET switches 21 through 27. Operation involves charging series-connected capacitors 30 and 31 through MOSFETs 21, 22 and 23 as illustrated by a solid line and arrow. After charging, the flying capacitors transfer charge from output capacitor 32 through conducting MOSFETs 24, 25, 26 and 27.

During charging, capacitors 30 and 31 are connected in series and charge to a voltage equal to $V_{batt}/2$. During charge transfer, capacitors 30 and 31 are wired in parallel, connected in series with the battery input $V_{batt}$ with the series combination connected across output capacitor 32. The output voltage is charged to a voltage $V_{out} \rightarrow 1.5 V_{batt}$, a voltage 25% lower than the output of the doubler charge pump 1.

By employing a 1.5×-type fractional charge pump technique, efficiency is improved at lower output voltages but limited to a maximum of 1.5 times its input. Moreover, a 1.5× fractional charge pump, like the 2×-type charge pump, does not regulate voltage. As a result, its output voltage varies with its input which is undesirable in many applications.

Charge Pump Efficiency Considerations: Since a charge pump's output voltage varies with its input, it is not well adapted as a power converter and must often be combined with a linear regulator connected in series with the charge pump, to limit the output voltage swing. The linear regulator may be connected in either the input or output of the charge pump.

For example, a lithium ion input ranges from 4.2V to 3.0V during its discharge. Under such circumstances the output of a fractional 1.5× charge pump will vary in its output from 6.3V to 4.5V. A 2×-type charge pump doubler's output will vary from 8.4V to 6V under the same circumstances. If the load voltage is maintained at a fixed voltage, either by a linear regulator or because the load clamps the voltage across its terminals, then the efficiency will vary with the input voltage. The efficiency variation of linear regulated 1.5× and 2× charge pumps are summarized in the following table for a few commonly needed supply voltages. The output voltages of unregulated charge pumps are included in the table for reference along with a linear regulator with no charge pump, referred to in the table as a 1× converter.

| Charge Pump | Unregulated Voltage $V_{CP}$ | | | LiIon Regulation Efficiency $\eta_{max}$ by $V_{out}$ | | | | |
|---|---|---|---|---|---|---|---|---|
| | Max | Typ | Min | 1.8 V | 2.5 V | 3 V | 3.3 V | 5 V |
| 2X | 8.4 V | 7.2 V | 6 V | 21%-30% | 30%-42% | 36%-50% | 39%-55% | 60%-83% |
| 1.5X | 6.3 V | 5.4 V | 4.5 V | 29%-40% | 40%-45% | 48%-67% | 52%-73% | 80%-NA |
| 1X | 4.2 V | 3.6 V | 3 V | 43%-60% | 60%-83% | 71%-NA | 79%-NA | NA |

As shown, each output voltage exhibits a range of efficiencies that varies with the battery's voltage, starting with a lower efficiency when the LiIon cell is fully charged to 4.2V and improving as the battery discharges down to 3V. The term "NA" means not available, meaning that the charge pump is incapable of producing the desired output voltage over the full range of inputs. Efficiency has no meaning if the output falls out of regulation. It should be also be noted that the efficiency shown in the table, given by the relation:

$$\eta = \frac{V_{out}}{V_{CP}} = \frac{V_{out}}{n \cdot V_{in}}$$

is the maximum theoretical efficiency of the charge pump, not taking into account losses in MOSFET resistance, switching losses, or other parasitic effects. The losses may further degrade efficiency by 3% to 6% below the theoretical maximum efficiency values shown.

From the table it is clear that efficiency is highest when the desired output voltage is close to the unregulated charge pump voltage, i.e. when $V_{out} \approx V_{CP}$. Lower output voltages therefore suffer from lower efficiencies because the charge pump is over-pumping the voltage to too high a value. For example a 1.8V volt output for a charge pump doubler has a peak theoretical efficiency of 30% while a 3V output has a conversion efficiency of 50%. Under the same circumstances, the fractional charge pump has a higher efficiency, 40% for a 1.8V output and 67% for a 3V output, because it is not pumping its output to as high a voltage as the doubler.

On the other hand, a fractional charge pump cannot output all the voltages commonly desired in a system. For example, a 1.5× charge pump cannot produce a 5V output over the full lithium ion range. At slightly above 3.3V the output voltage will sag below the desired 5V and the system may fail, meaning a 1.5× charge pump cannot be used reliably to produce a 5V regulated supply, despite having a higher efficiency when it is able to do so.

So if higher charge-pump multiples are used, e.g. n=2, the converter regulates over a wider voltage range but operates at lower efficiencies. If lower conversion factors of n are used, e.g. n=1.5 or even n=1, then the converter cannot supply the voltage over the full battery operating range unless the condition $V_{CP}(min) > V_{out}$ can be maintained.

One solution to the range versus efficiency tradeoff is to employ mode switching, i.e. to combine the doubler and fractional charge pumps into a single circuit, operating in 1.5× mode until the battery discharges and switching into 2× mode when the battery discharges. In this manner a higher average efficiency may be maintained over the battery voltage range. Such mode switching charge pumps capable of operating at two different values of "n", in this case at 1.5× and 2×, are referred to as dual-mode charge pumps.

For outputs such as 3V and 3.3V even the 1× mode, or linear regulator only mode, may be used for some portion of time before the charge pump needs to turn on. By combining 1.5× and 1× mode charge pumps into a single charge pump, the resulting dual-mode charge pump is better adapted to lower voltage outputs than combining 2× and 1.5× modes.

Even more versatile, but slightly more complex a tri-mode charge pump, may operate in any of three modes, for example operating in step-down-only 1×-mode when the battery is charged, switching to 1.5× mode as the battery becomes discharged, and jumping into 2× mode if a higher voltage or current is temporarily demanded by the load. As one example, a tri-mode charge pump can drive 3.6V white LEDs as the back light in a cell phone using its 1.5× and 1× modes, and then momentarily switch into 2× mode whenever the 4.5V camera flash LEDs are needed.

An example of a tri-mode charge pump 35 is illustrated in FIG. 1C where the charging and discharging of flying capacitors 45 and 46 are controlled by a matrix of MOSFET switches. This matrix combines topological elements of charge pump doubler circuit 1 with fractional charge pump 20, along with the means by which the entire charge pump circuit may be bypassed to achieve 1× pass-through operation.

Except in 1× bypass mode where the charge pump is not switching, tri-mode charge pump 35 operates by the same principal as single-mode charge pumps 1 and 20, i.e. by successively charging flying capacitors 45 and 46 to a voltage $V_{fly}$, then transferring their charge to output filter capacitor 49 as needed. In the 1.5× mode, the capacitors are series connected and each charged to a voltage of $V_{batt}/2$ through conducting MOSFETs 36, 37 and 38 while all other MOSFETs remain off. In 2×-mode, each flying capacitor is placed in parallel with the battery and charged to a voltage $V_{batt}$ through conducting switches 36, 39, 42 and 38 while all other MOSFETs, including MOSFET 37 remain off.

The charge transfer mode is the same regardless whether flying capacitors 45 and 46 are charged to a voltage $V_{batt}$ or $V_{batt}/2$. Conducting MOSFETs 40 and 42 connect the negative terminals of charged capacitors 45 and 46 to the input voltage $V_{batt}$. Conducting MOSFETs 43 and 44 along with forward biased diodes 47 and 48 connect the positive terminals of charged capacitors 45 and 46 to the converter's output and to filter capacitor 49. Charge transfer there occurs so that $V_{out} \rightarrow (V_{batt} + V_{fly})$. If $V_{fly}$ is charged to a voltage $V_{batt}$, then $V_{out} \rightarrow 2V_{batt}$ and charge pump circuit 35 operates as a doubler. If $V_{fly}$ is charged to a voltage $V_{batt}/2$, then $V_{out} \rightarrow 1.5V_{batt}$ and circuit 35 operates as a 1.5×-type fractional charge pump.

To operate in 1× bypass mode, conducting MOSFETs 36, 42, 43, 44 and optionally 40 and 37 connect $V_{out}$ directly to $V_{batt}$. No switching action is needed in this operating mode.

So aside from the disadvantage of containing a large number of MOSFETs to implement the switching matrix, tri-mode charge pump 35 can adjust its mode to reduce over-pumping and improve operating efficiency at any given output voltage.

Limitations of Charge Pumps: Many systems today require more than one regulated output voltage. One solution to this problem is to step up the battery voltage with a charge pump and then regulate down to lower voltages using more than linear regulator as illustrated in schematic 50 of FIG. 2.

As shown charge pump 51 powered by LiIon battery 58 generates a voltage $V_{CP}$ which is stored on reservoir capacitor 57 and then regulated by linear regulators 51, 52, and 53 to produce various required regulated voltages $V_{out1}$, $V_{out2}$, and $V_{out3}$. Capacitors 54, 55, and 56 provide added filtering and improve regulator stability.

For example using a doubler for charge pump 51, linear regulators 51, 52 and 53 may be used to produce any desired voltage from 1V to nearly 6V. Using a fractional charge pump to implement converter 51, the guaranteed voltage $V_{CP}$ is limited to below 3V since a 1.5×-mode cannot reliably produce a 3V output and since some voltage, typically 300 mV, is lost as a voltage drop across the linear regulator.

Furthermore, if both positive, i.e. above ground, and negative, i.e. below ground supply voltages are required by the system, the approach of FIG. 2 cannot be employed and multiple charge pumps are required.

In summary, the limitation of today's charge pumps is that they produce a single-voltage single-polarity output. While the charge pumps output voltage may be varied in time by mode switching, it must always deliver a voltage $V_{CP}$ higher than the highest voltage required by the system. Such restrictions greatly limit the use of charge pumps, forcing designers to employ one charge-pump per load, undesirably increasing costs, component count, and printed circuit board space.

What is really needed is a multiple output charge pump voltage converter or regulator capable of producing any number of positive and negative supply voltages simultaneously with the minimum number of components.

SUMMARY OF THE INVENTION

A multiple output DC-to-DC voltage converter using a new time-multiplexed-capacitor converter algorithm and related circuit topologies is herein disclosed. Unlike conventional charge pumps limited to producing a single output per charge pump, the new time-multiplexed-capacitor topology and method generates multiple voltage outputs of both positive and negative polarities from a single supply voltage or battery input. For the sake of clarity, the various embodiments of this invention are subdivided into four classes—dual polarity multiple-output converters, multiple-positive-output converters, multiple negative output converters, and re-configurable multiple-output converters.

Dual-Polarity Time-Multiplexed-Capacitor Converters: One embodiment of this invention is a time-multiplexed-capacitor converter capable of producing positive and negative output voltages. A representative implementation of this embodiment includes a flying capacitor, a first output node, a second output node, and a switching network. The switching network configured to provide the following modes of circuit operation: 1) a first mode where the positive electrode of the flying capacitor is connected to an input voltage and the negative electrode of the flying capacitor is connected to ground; 2) a second mode where the negative electrode of the flying capacitor is connected to the input voltage and the positive electrode of the flying capacitor is connected to the first output node; and 3) a third mode where the positive electrode of the flying capacitor is connected to ground and the negative electrode of the flying capacitor is connected to the second output node.

The first mode of operation charges the flying capacitor to a voltage equal to the input voltage. The second mode of operation provides a voltage of twice the input voltage at the first output node. The third mode of operation provides a voltage equal in magnitude but opposite in polarity to the input voltage at the second output node. Thus, a positive boosted voltage and an inverted voltage are provided using a single multiplexed flying capacitor.

A second representative implementation of this embodiment includes a first flying capacitor, a second flying capacitor, a first output node, a second output node, and a switching network. The switching network configured to provide the following modes of circuit operation: 1) a first mode where the first and second flying capacitors are connected in series with the positive electrode of the first flying capacitor connected to an input voltage and the negative electrode of the second flying capacitor is connected to ground; 2) a second mode where the negative electrodes of the flying capacitors are connected to the input voltage and the positive electrodes of the flying capacitors are connected to the first output node; and 3) a third mode where the positive electrodes of the flying capacitors are connected to ground and the negative electrodes of the flying capacitors are connected to the second output node.

The first mode of operation charges the flying capacitor to a voltage equal to one half of the input voltage. The second mode of operation provides a voltage of 1.5 times the input voltage at the first output node. The third mode of operation provides a voltage equal to −0.5 the input voltage at the second output node. Thus, a positive boosted fractional voltage and an inverted fractional voltage are provided using two multiplexed flying capacitors.

Positive Multiple Output Time-Multiplexed-Capacitor Converters: Another embodiment of this invention is a time-multiplexed-capacitor dual-output converter capable of simultaneous producing two positive fractional outputs $+1.5V_{batt}$ and $+0.5V_{batt}$ (where $V_{batt}$ is represents the input voltage to the charge pump). A representative implementation of this embodiment includes a first flying capacitor, a second flying capacitor, a first output node, a second output node, and a switching network. The switching network configured to provide the following modes of circuit operation: 1) a first mode where the first and second flying capacitors are connected in series with the positive electrode of the first flying capacitor connected to an input voltage and the negative electrode of the second flying capacitor is connected to ground; 2) a second mode where the negative electrodes of the flying capacitors are connected to the input voltage and the positive electrodes of the flying capacitors are connected to the first output node; and 3) a third mode where the negative electrodes of the flying capacitors are connected to ground and the positive electrodes of the flying capacitors are connected to the second output node.

The first mode of operation charges the flying capacitor to a voltage equal to one half of the input voltage. The second mode of operation provides a voltage of 1.5 times the input voltage at the first output node. The third mode of operation provides a voltage equal to 0.5 the input voltage at the second output node. Thus, two positive boosted fractional voltages are provided using two multiplexed flying capacitors.

Multiple Negative Output Time-Multiplexed-Capacitor Converters: In another embodiment of this invention, a time-multiplexed-capacitor dual-output converter capable of simultaneously producing two negative fractional outputs $-0.5V_{batt}$ and $-V_{batt}$ (where $V_{batt}$ is represents the input voltage to the charge pump). A representative implementation of this embodiment includes a first flying capacitor, a second flying capacitor, a first output node, a second output node, and a switching network. The switching network configured to provide the following modes of circuit operation: 1) a first mode where the first and second flying capacitors are connected in series with the positive electrode of the first flying capacitor connected to an input voltage and the negative electrode of the second flying capacitor is connected to ground; 2) a second mode where the positive electrodes of the flying capacitors are connected to ground and the negative electrodes of the flying capacitors are connected to the first output node; and 3) a third mode where the first and second flying capacitors are connected in series with the positive electrode of the first flying capacitor connected to ground and the negative electrode of the second flying capacitor is connected to the second output node.

The first mode of operation charges the flying capacitors to a voltage equal to one half of the input voltage. The second mode of operation provides a voltage of −0.5 times the input voltage at the first output node. The third mode of operation provides a voltage equal to −1.0 times the input voltage at the second output node. Thus, two inverted fractional voltages are provided using two multiplexed flying capacitors.

Reconfigurable Multi-Output Time-Multiplexed Fractional Charge Pumps: The time-multiplexed-capacitor charge pump can be scaled for supplying several different voltages simultaneously, and can be electronically reconfigured to produce a different set of voltages. A representative implementation of this embodiment includes a first flying capacitor, a second flying capacitor, a first output node, a second output node, a third output node, and a switching network. The switching network configured to provide the following modes of circuit operation: 1) a first mode where the flying capacitors are connected in series or in parallel between an input voltage ($V_{IN}$) and ground to allow the flying capacitors to be charged to any of the following voltages: $V_{IN}$, $-V_{IN}$, ½ $V_{IN}$, $-½V_{IN}$; and 2) a second mode where the first and second flying capacitors are connected in series with the negative electrode of the second flying capacitor connected to the input voltage and the positive electrode of the first flying capacitor is connected to the first output node; and 3) a third mode where the negative electrodes of the flying capacitors are connected to the input voltage and the positive electrodes of the flying capacitors are connected to the second output node.

A range of different output voltages are provided to the three output nodes depending on the configuration of the switching network during charging and output. At least the following combinations are available (each triple represents the output at the first output node, the voltage at the second output node and the voltage at the third output node):
1) $3V_{batt}$, $2V_{batt}$, $-V_{batt}$;
2) $2V_{batt}$, $1.5V_{batt}$, $0.5V_{batt}$;
3) $2V_{batt}$, $1.5V_{batt}$, $-0.5V_{batt}$;
4) unused, $-V_{batt}$, $-2.0_{batt}$;
5) unused, $-0.5_{batt}$, $-V_{batt}$.

BRIEF DESCRIPTION OF THE DRAWINGS

FIG. 5 is a flowchart of time-multiplexed doubler/inverter dual-output charge pump operation.

FIG. 6 is a state diagram describing operation of a time-multiplexed doubler/inverter dual-output charge pump.

FIG. 19E is a flowchart showing a method for feedback control for a multi-output charge pump.

DETAILED DESCRIPTION OF THE PREFERRED EMBODIMENTS

A multiple output DC-to-DC voltage converter using a new time-multiplexed-capacitor converter algorithm and related circuit topologies is herein disclosed. Unlike conventional charge pumps limited to producing a single output per charge pump, the new time-multiplexed-capacitor topology and method generates multiple voltage outputs of both positive and negative polarities from a single supply voltage or battery input. For the sake of clarity, the various embodiments of this invention are subdivided into four classes—dual polarity multiple-output converters, multiple-positive-output converters, multiple negative output converters, and re-configurable multiple-output converters.

Figure 1A:
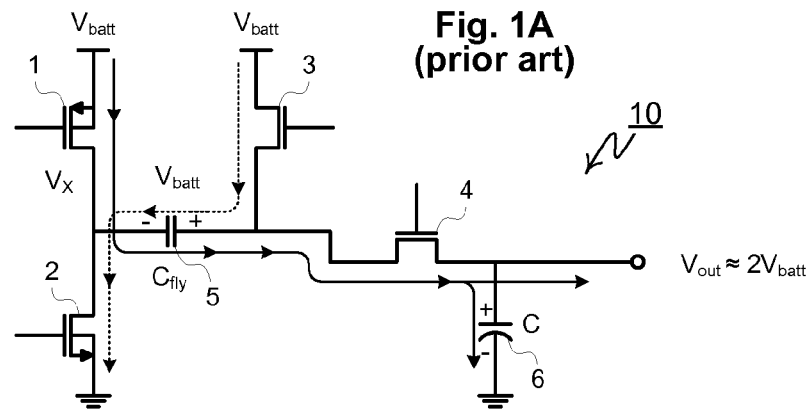
FIG. 1A is a block diagram of a prior art 2×-type charge pump.
Figure 1B:
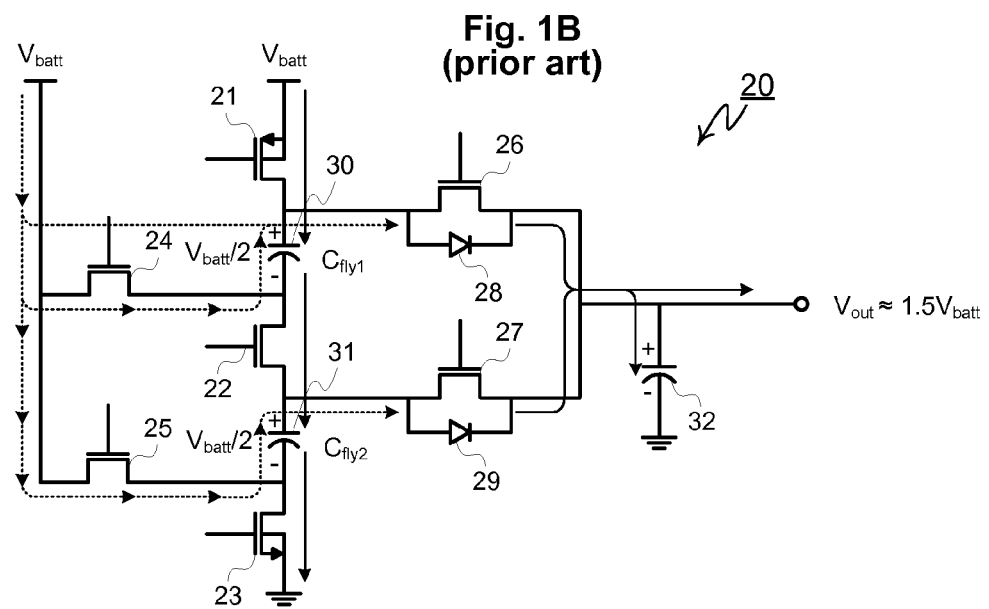
FIG. 1B is a block diagram of a prior art 1.5×-type charge pump.
Figure 1C:
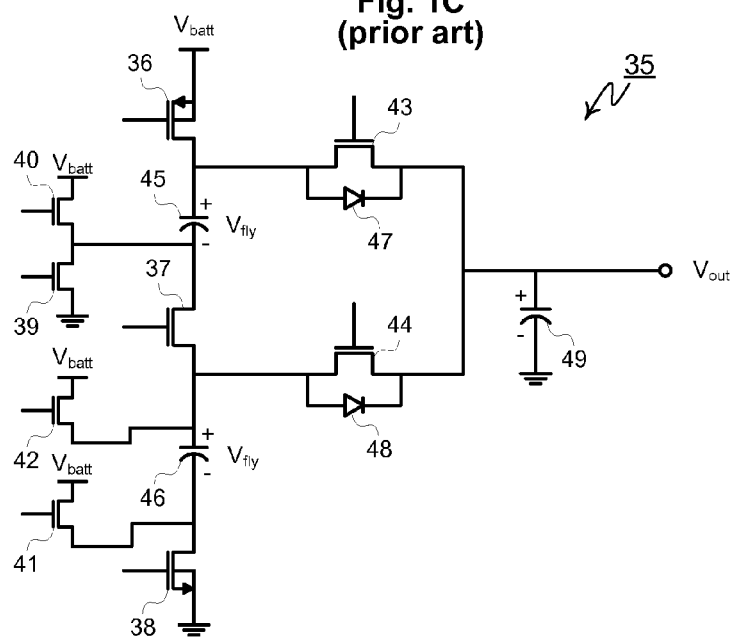
FIG. 1C is a block diagram of a prior art tri-mode 1×/1.5×/2×-type charge pump.
Figure 2:
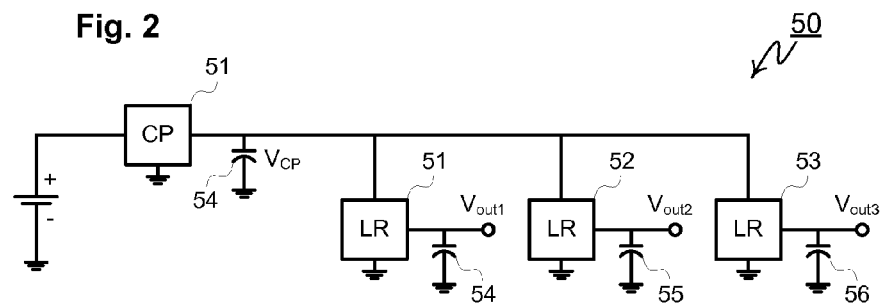
FIG. 2 is a block diagram showing a charge pump supplying multiple-output using several linear regulators.
Figure 3:
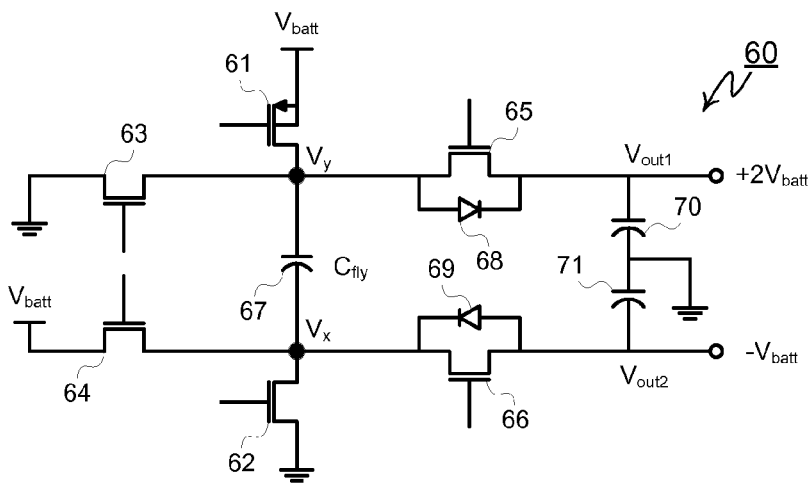
FIG. 3 is a block diagram of a time-multiplexed doubler/inverter dual-output charge pump.

Dual-Polarity Time-Multiplexed-Capacitor Converters: One embodiment of this invention is a time-multiplexed-capacitor converter capable of producing positive and negative output voltages simultaneously. In FIG. 3 for example, circuit 60 illustrates a time-multiplexed-capacitor dual-output converter capable of simultaneous producing doubler and inverter outputs $+2V_{batt}$ and $-V_{batt}$.

The converter comprises a single flying capacitor 67, MOSFETs 61 through 66, and reservoir capacitors 70 and 71. Optionally MOSFETs 65 and 66 may include intrinsic drain-to-source P-N diodes 68 and 69 depending on MOSFET implementation. Operation involves a sequence of four phases—charging the flying capacitor, transferring charge to the positive output capacitor, refreshing the flying capacitor, and transferring charge to the negative output capacitor.

Figure 4A:
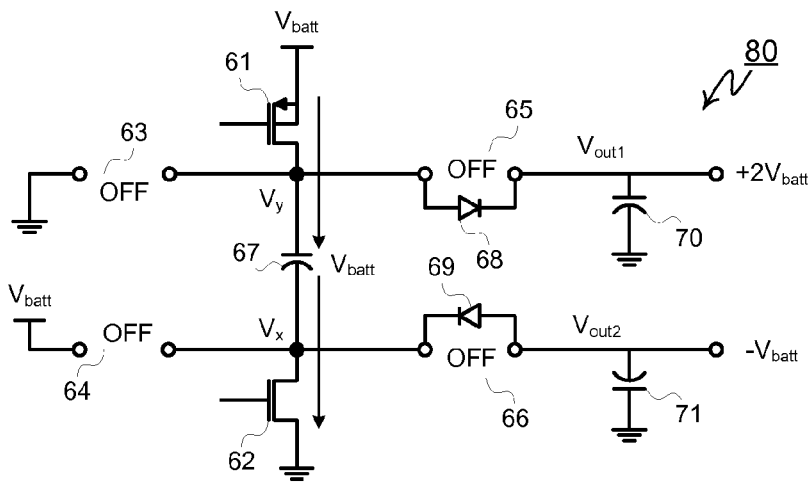
FIG. 4A shows the operation of a doubler/inverter charge pump during flying cap charging.

In greater detail, in the first phase of operation shown by circuit 80 in FIG. 4A, also referred to herein as the charging phase, conducting MOSFETs 61 and 62 charge flying capacitor 67 to a voltage $+V_{batt}$ through while all other MOSFETs remain off. In the schematic, the charging current is represented by a solid line and arrow. During charging, the flying capacitor's terminals are biased at $V_y \approx V_{batt}$ and $V_x \approx 0$ with diodes 68 and 69 oriented in a direction so as to remain reverse biased and non-conducting. Any current supplied to loads connected to either the positive or negative outputs (not shown) must be delivered by the output capacitors 70 and 71 during this phase.

Figure 4B:
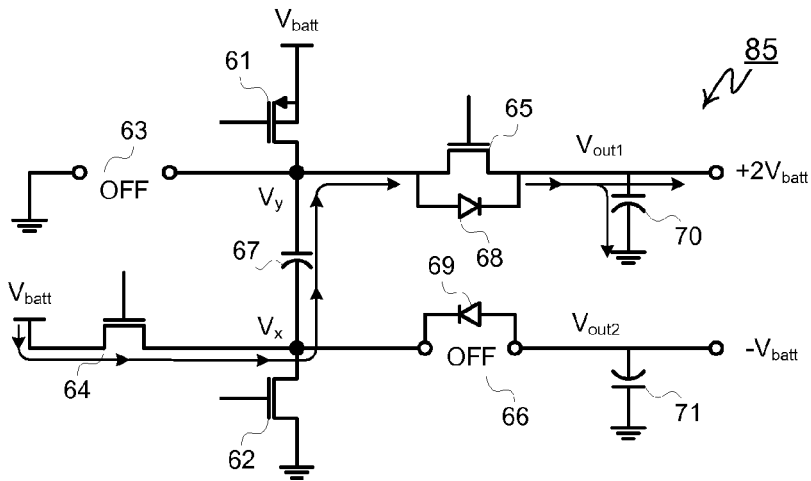
FIG. 4B shows the operation of a doubler/inverter charge pump during charge transfer to its +2× output.

In the second phase of operation shown by circuit 85 in FIG. 4B, referred to herein as the positive charge transfer phase, MOSFETs 61 and 62 are shut off and MOSFETs 64 and 65 are turned on transferring charge from flying capacitor to the positive output's capacitor 70 and to any load (not shown). Current flow during charge transfer is shown by solid arrows. By virtue of conducting MOSFET 64, the negative terminal $V_x$ of charged flying capacitor 67 is connected to $V_{batt}$, so that $V_x = V_{batt}$ and diode 69 remains reverse biased and non-conducting. MOSFETs 63 and 66 remain off during this operating phase. With its negative terminal connected atop the battery input, the positive terminal $V_y$ of flying capacitor 67 then becomes $(V_{batt}+V_{fly})$ charging the positive output $V_{out1}$ across capacitor 70 to a positive, i.e. above ground, voltage $V_{out1} \rightarrow +2V_{batt}$.

Figure 4C:
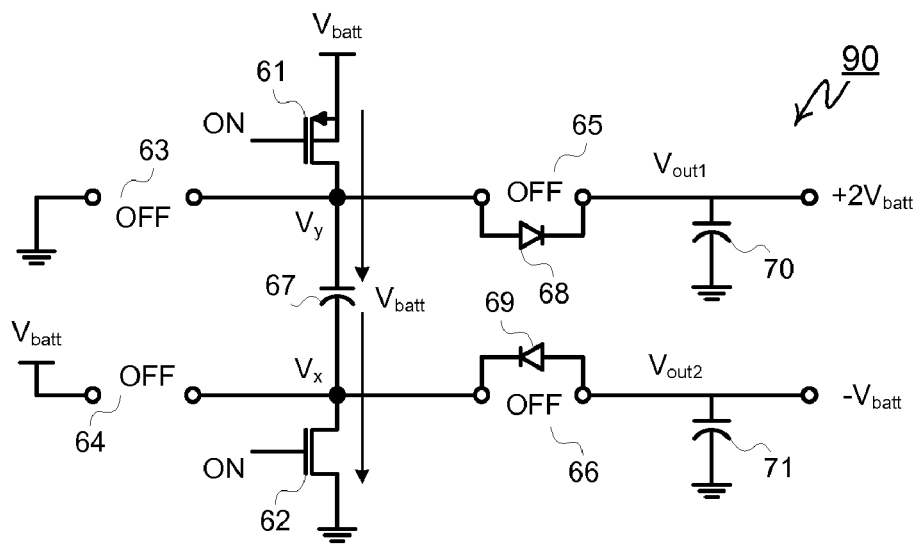
FIG. 4C shows the operation of a doubler/inverter charge pump during flying capacitor refresh.

The third phase of operation shown by circuit 90 in FIG. 4C, also referred to herein as the refresh phase, is electrically identical to first phase 80. During capacitor refresh, conducting MOSFETs 61 and 62 once again charge flying capacitor 67 to a voltage $+V_{batt}$ through while all other MOSFETs remain off. During charging, the flying capacitor's terminals are biased at $V_y \approx V_{batt}$ and $V_x \approx 0$ with diodes 68 and 69 oriented in a direction so as to remain reverse biased and non-conducting. Any current supplied to loads connected to either the positive or negative outputs (not shown) must be delivered by the output capacitors 70 and 71 during this phase.

Figure 4D:
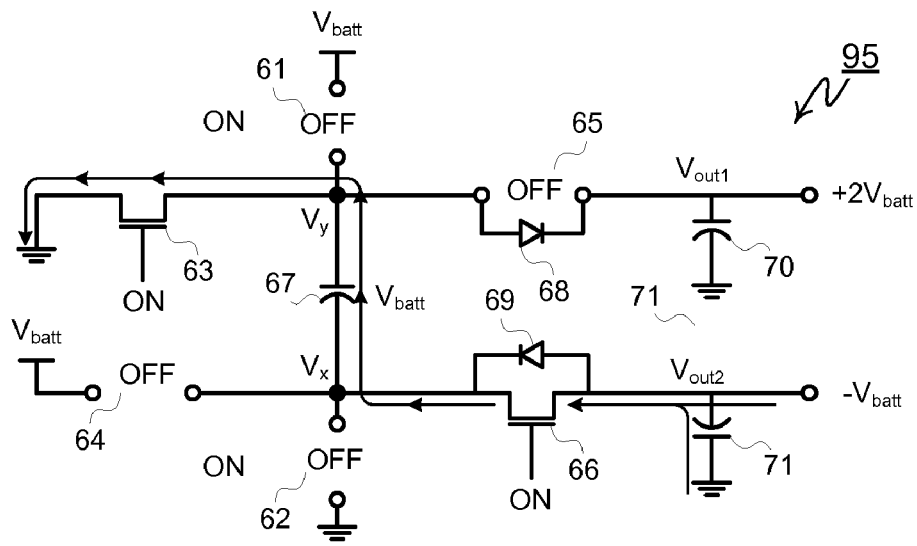
FIG. 4D shows the operation of a doubler/inverter charge pump during charge transfer to its −1× output.

In the fourth and final phase of operation shown by circuit 95 in FIG. 4D, referred to herein as the negative charge transfer phase, MOSFETs 61 and 62 are shut off and MOSFETs 63 and 66 are turned on transferring charge from flying capacitor 67 to the negative output's capacitor 71 and to any load (not shown). Current flow during charge transfer is shown by solid arrows. By virtue of conducting MOSFET 63, the positive terminal $V_y$ of charged flying capacitor 67 is connected to ground, so that $V_y=0$ and diode 68 remains reverse biased and non-conducting. MOSFETs 65 and 64 remain off during this operating phase. With its positive terminal connected to the ground, the negative terminal $V_x$ of flying capacitor 67 then is forc3ed below ground to a voltage $(-V_{fly})$ charging the negative output $V_{out2}$ across capacitor 71 to a negative, i.e. below ground, voltage $V_{out2} \rightarrow -V_{batt}$.

The entire cycle then repeats itself as shown in flow chart 99 of FIG. 5. As shown, the sequence of charge, transfer, charge, transfer with the switches being reconfigured in between has the function of repeatedly alternating charging the positive $V_{out1}$ output to $+2V_{batt}$ and the negative $V_{out2}$ output to $-V_{batt}$ over time while using a single flying capacitor to power both positive and negative outputs. The flying capacitor's charge transfer is therefore time multiplexed between both outputs, and can therefore be referred to as a time-multiplexed-capacitor multiple-output DC/DC voltage converter.

FIG. 6 illustrates the state diagram 100 for converter 60. In the charging state 110, battery 101 is in parallel with flying capacitor 67, which charges to a voltage $V_{batt}$. To maximize converter efficiency, the charging of capacitor 67 should preferably be completed before exiting state 110. Partial charging lowers overall efficiency.

During transition ① the converter is reconfigured for charge transfer to the positive output, i.e. to state 111. In charge transfer condition 111, capacitor 67 stacked atop battery 101 with its negative terminal $V_x$ tied to the positive terminal of battery 101, charges capacitor 70 to a voltage +2$V_{batt}$.

In one embodiment of this invention, the converter is next reconfigured in transition ② back into charging state 110. The charging state 110 then repeats until capacitor 67 charges to a voltage $V_{batt}$ replenishing any charge lost during state 111.

After the capacitor is refreshed, the converter is again reconfigured during transition ③ into charge transfer state 112. During this state, charge flying capacitor 67 is connected below ground with its positive terminal $V_y$ connected to the negative terminal of battery 101. In this configuration, charge transfer from flying capacitor 67 to output capacitor 71 drives the negative output to a voltage equal to $-V_{batt}$.

The converter is then reconfigured in transition ④ back into charging state 110. The charging state 110 then repeats until capacitor 67 charges to a voltage $V_{batt}$ replenishing any charge lost during state 112.

Figure 7:
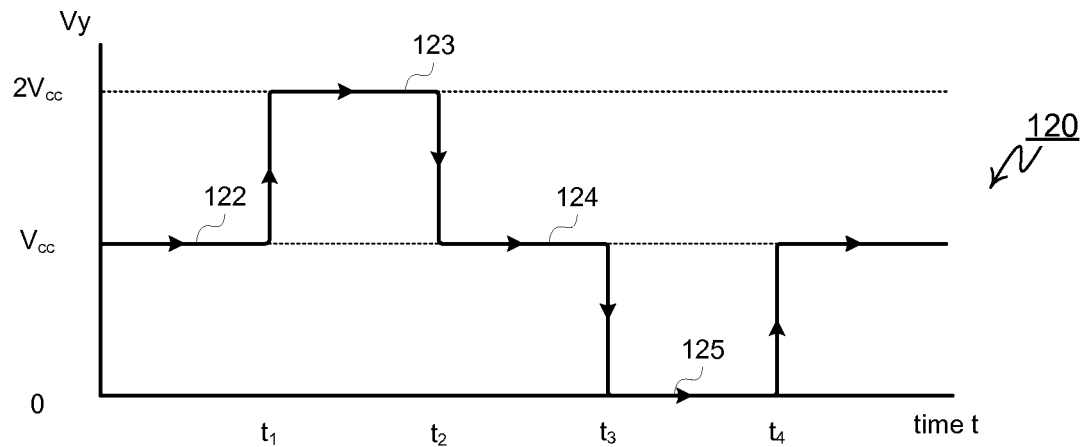
FIG. 7 is a graph of switching waveforms of a time-multiplexed doubler/inverter dual-output charge pump.
Figure 7:
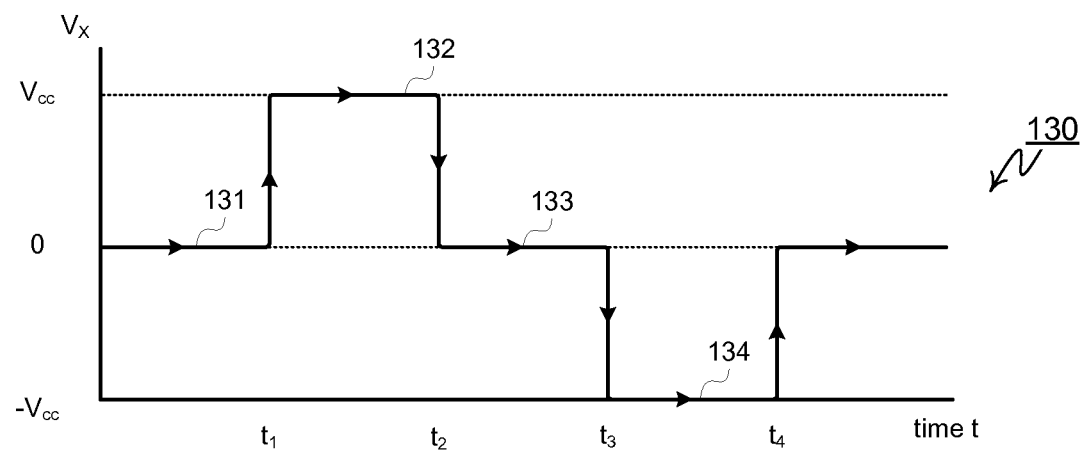
Figure 7:
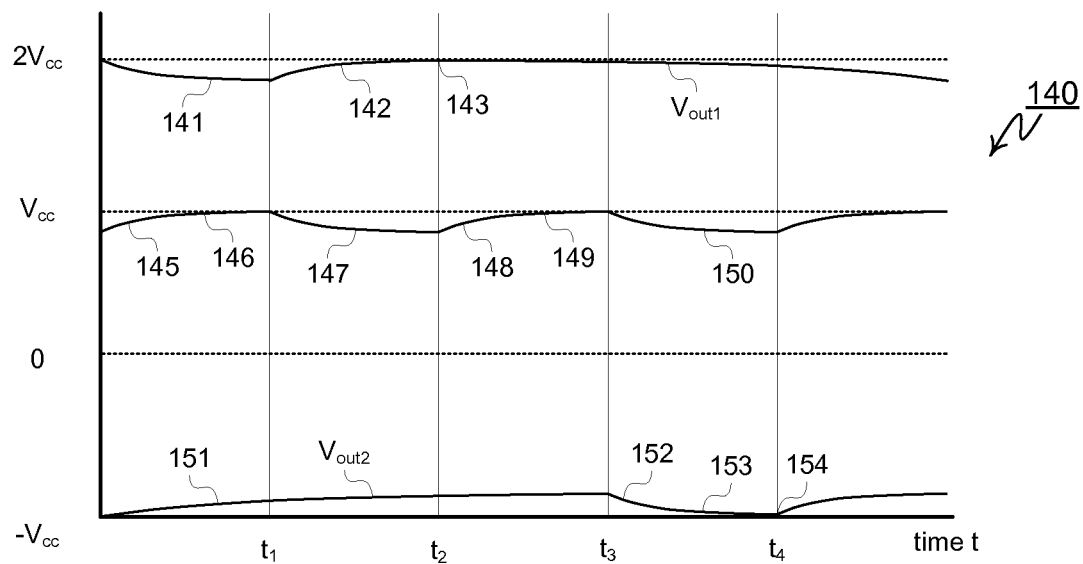

The entire then repeats in sequence ① charge ② positive transfer ③ charge ④ negative transfer and then repeating ①, ②, ③, ④, ①, etc. . . . The voltage waveforms for this time multiplexed sequence is illustrated in the graphs of FIG. 7, including voltage $V_y$ shown in graph 120, voltage $V_x$ shown in graph 130, and voltages $V_{out1}$, $V_{out2}$ and $V_{fly}$ shown in graph 140.

From time $t_0$ to $t_1$ corresponding to state 110, flying capacitor 67 is charged whereby $V_y$ charges to $V_{cc}$ as shown by curve 121 and $V_x$ remains near ground shown by curve 131. During this cycle $V_{out1}$ sags below a value of $2V_{cc}$ until it reaches its minimum voltage at time $t_1$. In tandem, $V_{out2}$ also sags 151 to a lower, i.e. less negative, voltage than $-V_{cc}$.

Meanwhile $V_{fly}$ charges during interval 145 till it reaches a voltage $V_{cc}$ where it remains through the rest the state 110 until $t_1$.

During interval $t_1$ to $t_2$ corresponding to state 111, $V_x$ is biased to $V_{cc}$ during the entire cycle 132 and $V_y$ is forced to $2V_{cc}$ as flying capacitor 67 "flies up" and transfers its charge to the positive output's filter capacitor 70. As a result $V_{out1}$ is refreshed in transition 142 while $V_{fly}$ decays in corresponding 147.

From time $t_2$ to $t_3$ the circuit returns to state 110, flying capacitor 67 is replenished as whereby $V_y$ charges to $V_{cc}$ as shown by curve 124 and $V_x$ remains near ground shown by curve 133. During this cycle $V_{out1}$, now fully charged, first begins to sag 143. In tandem, $V_{out2}$ continues to sags 151 to a lower, i.e. less negative, voltage than $-V_{cc}$. Meanwhile $V_{fly}$ charges during interval 148 till it reaches a voltage $V_{cc}$ where it remains 149 through the rest the state 110 until $t_3$.

During interval $t_3$ to $t_4$ corresponding to state 112, $V_y$ is biased to ground during the entire cycle 125 and $V_x$ is forced to $-V_{cc}$ as flying capacitor 67 flies down and transfers its charge to the negative output's filter capacitor 71. As a result $-V_{out2}$ is refreshed in transition 152 stabilizing at $-V_{cc}$ 153 while $V_{fly}$ decays in corresponding 150. At $t_4$, $-V_{out2}$ begins another cycle of decay as the cycle repeats itself.

In an alternative embodiment of this invention also shown in the state diagram of FIG. 6, transitions ② and ③ are replaced by transition ⑤ so that the flying capacitor is not refreshed between charge transfer states 111 and 112. The sequence then becomes: ①, ⑤, ④, ①, and so on.

Figure 8:
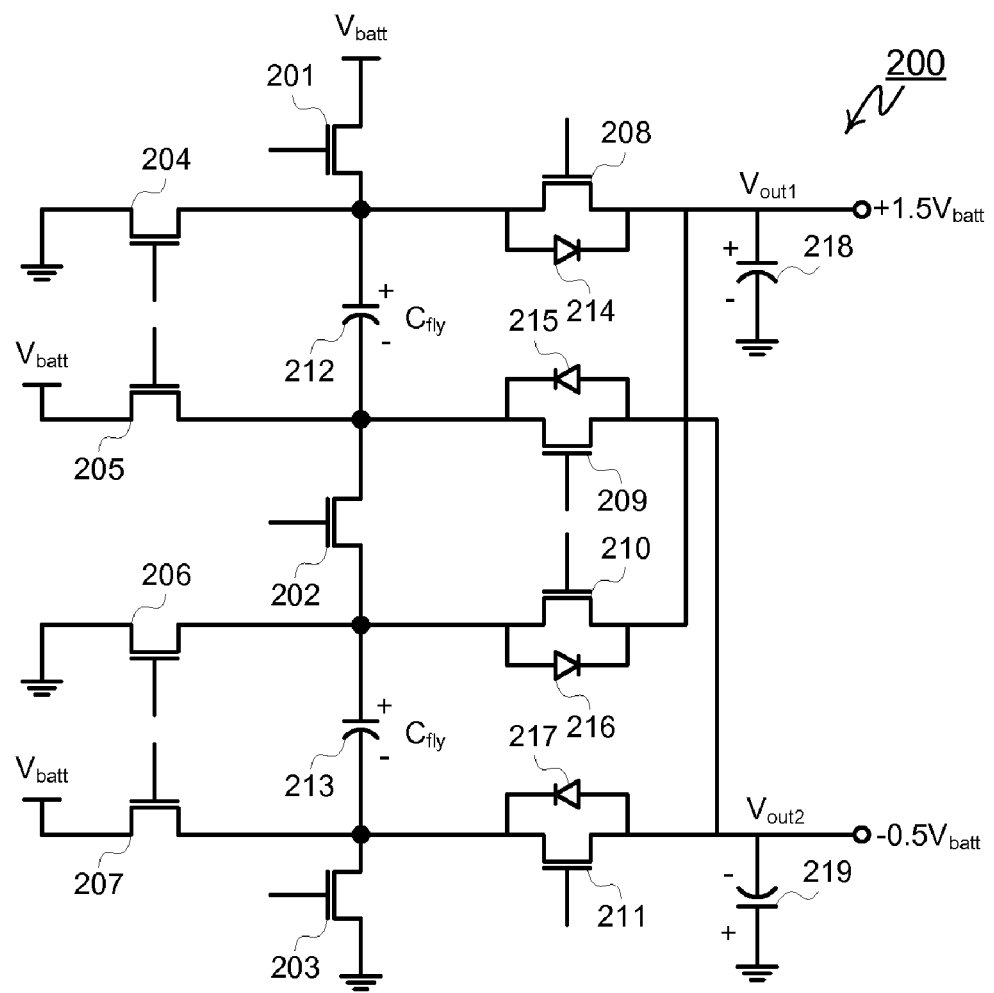
FIG. 8 is a schematic of a time-multiplexed fractional/fractional-inverter dual-output charge pump.

In a related embodiment of this invention, circuit 200 of FIG. 8 illustrates a time-multiplexed-capacitor dual-output converter capable of simultaneous producing positive fractional and inverting fractional outputs +1.5$V_{batt}$ and −0.5$V_{batt}$. The converter comprises a two flying capacitors 212 and 213, a matrix of MOSFETs 201 through 211, optional P-N diodes 214 through 217, and output filter capacitors 218 and 219.

Figure 9A:
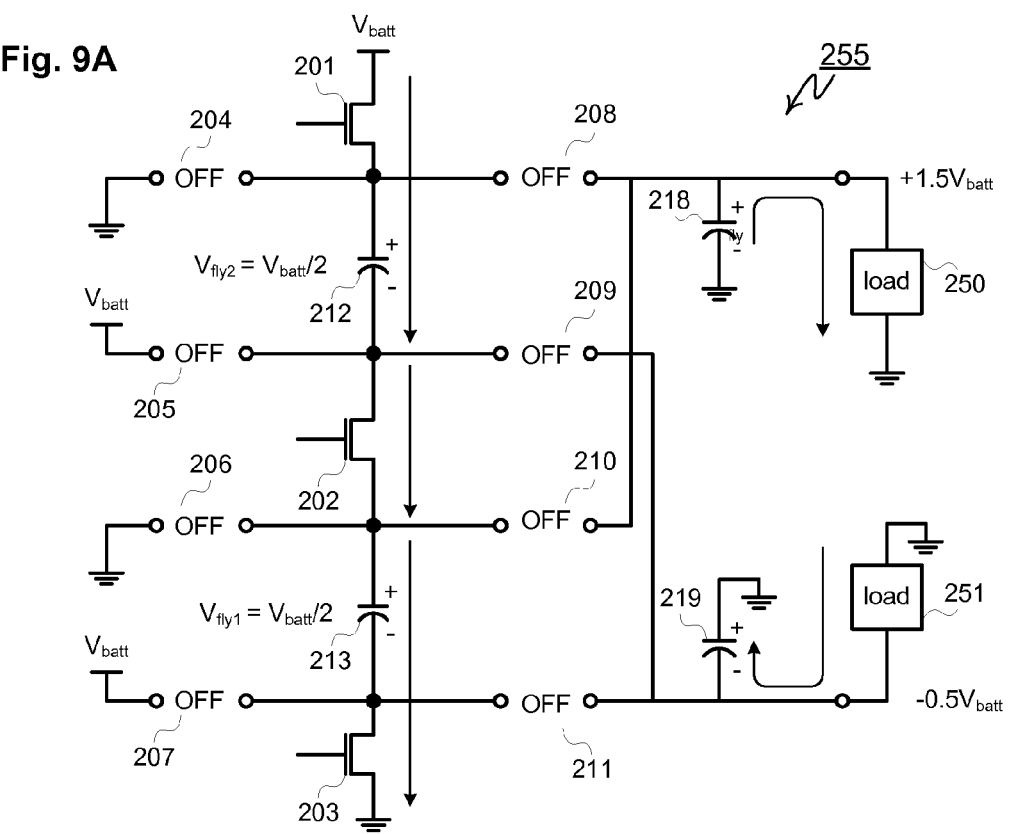
FIG. 9A shows the operation of a fractional/fractional-inverter charge pump during flying cap charging.

As shown in the equivalent circuit 255 of FIG. 9A, operation first involves charging the flying capacitors 212 and 215 through conducting MOSFETs 201, 202 and 203. Since the flying capacitors are series connected each one charges to a voltage $V_{batt}/2$. All other MOSFETs remain off and all diodes remain reversed biased during this cycle. Output capacitors 218 and 219 must supply the current to loads 250 and 251 during charging phase 255.

Figure 9B:
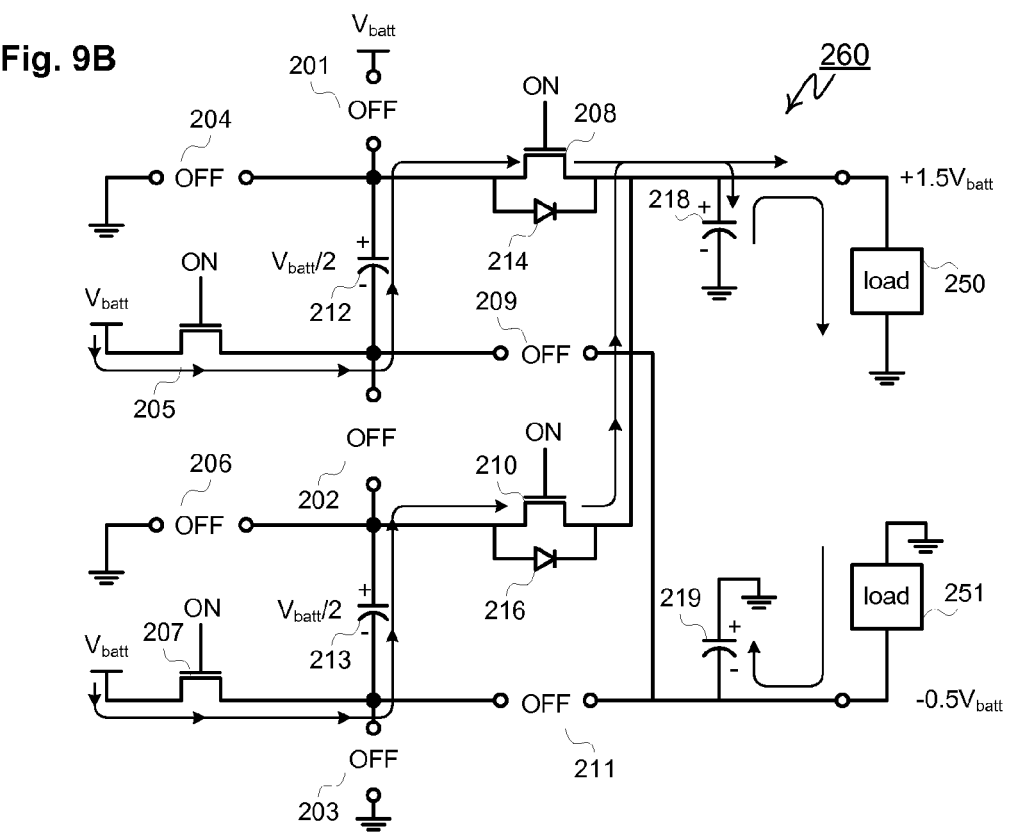
FIG. 9B shows the operation of a fractional/fractional-inverter charge pump during charge transfer to its +1.5× output.

In the next phase shown by schematic 260 in FIG. 9B, charge is transferred from flying capacitors 212 and 213, connected in parallel, to the positive supply $V_{out1}$, its corresponding filter capacitor 218, and to load 250. Since the negative terminals of the charged flying capacitors are connected to $V_{batt}$ through on MOSFETs 205 and 207, then the positive terminal of both flying capacitors jumps to a voltage of ($V_{fly}+V_{batt}$) or 1.5$V_{batt}$. With its positive terminals connected to output capacitor 218 through conducting MOSFETs 208 and 210, the output voltage $V_{out} \rightarrow +1.5V_{batt}$ as filter capacitor 218 charges. Optionally P-N diodes 214 and 216 intrinsic to MOSFETs 208 and 210 may be included depending on device construction, but must be oriented with their cathodes connected to the $V_{out1}$ terminal. In this phase of operation, all other MOSFETs remain off including 209 and 211. With $V_{out2}$ negative, diodes 215 and 217 also remain reverse biased.

In a preferred embodiment, in the third phase of operation the charge pump returns the charging condition 255 of FIG. 9A where capacitors 212 and 213 are each charged to $V_{batt}/2$. The circuit then continues into the fourth operating phase shown by equivalent circuit 265 of FIG. 9C. In an alternate embodiment, the capacitor refresh operation can be skipped, transitioning directly from circuit 260 to 265 without replenishing charge on the flying capacitors 212 and 213.

Figure 9C:
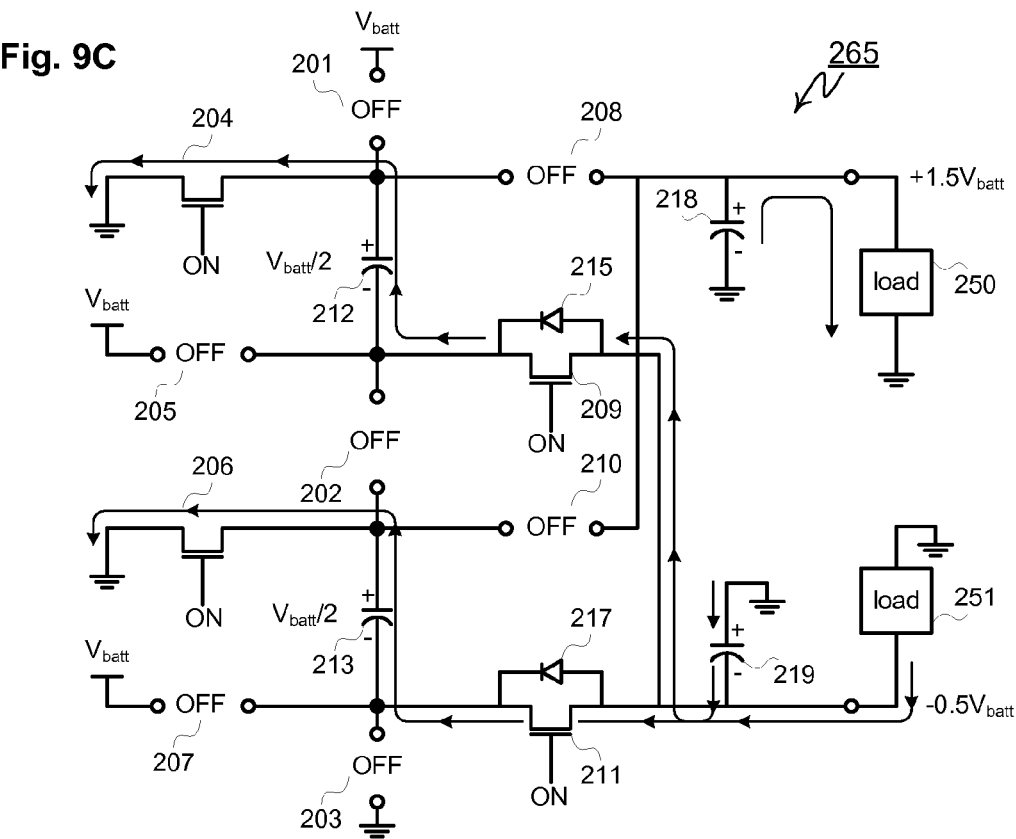
FIG. 9C shows the operation of a fractional/fractional-inverter charge pump during charge transfer to −0.5× output.

In the fourth and final phase shown by schematic 265 in FIG. 9C, charge is transferred from flying capacitors 212 and 213, connected in parallel, to the negative supply $V_{out2}$, its corresponding filter capacitor 219, and to load 251. Since the positive terminals of the charged flying capacitors are connected to ground through on MOSFETs 204 and 206, then the negative terminals of both flying capacitors jumps to a voltage of ($-V_{fly}$) or $-0.5V_{batt}$. With its negative terminals connected to output capacitor 219 through conducting MOSFETs 209 and 211, the output voltage $V_{out2} \rightarrow -0.5V_{batt}$ as filter capacitor 219 charges. Optionally P-N diodes 215 and 217 intrinsic to MOSFETs 209 and 211 may be included depending on device construction, but must be oriented with their anodes connected to the $V_{out2}$ terminal. In this phase of operation, all other MOSFETs remain off including 208 and 210. With $V_{out1}$ negative, diodes 214 and 216 also remain reverse biased.

Figure 9D:
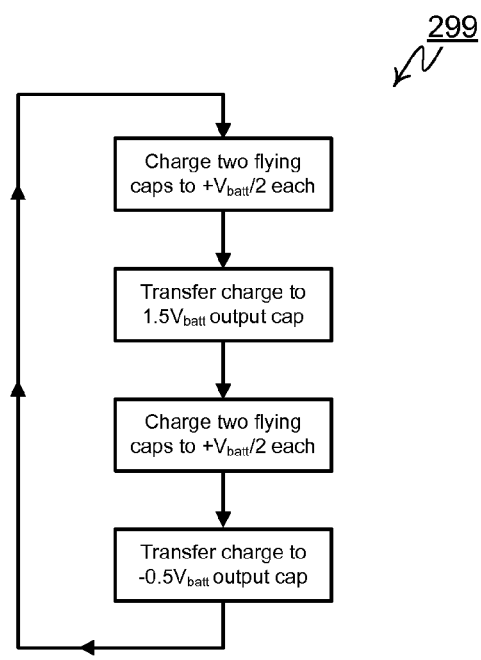
FIG. 9D is a flow chart showing the operation of a time-multiplexed fractional/fractional-inverter dual-output charge pump.

The operation of fractional dual-output time-multiplexed-capacitor converter 200 with a +1.5$V_{batt}$ positive output and a −0.5$V_{batt}$ negative output can be summarized in flow chart 299 of FIG. 9D with an algorithm of alternately charging, transferring charge to the positive output, charging, and transferring charge to the negative output in a manner similar to the flow chart of FIG. 5, except that the flying capacitor voltage $V_{fly}$ is increments of one-half $V_{batt}$, i.e. fractional, rather than integer multiples. For simplicity's sake, the steps of reconfiguring the MOSFETs between the various states are not shown explicitly.

Figure 10:
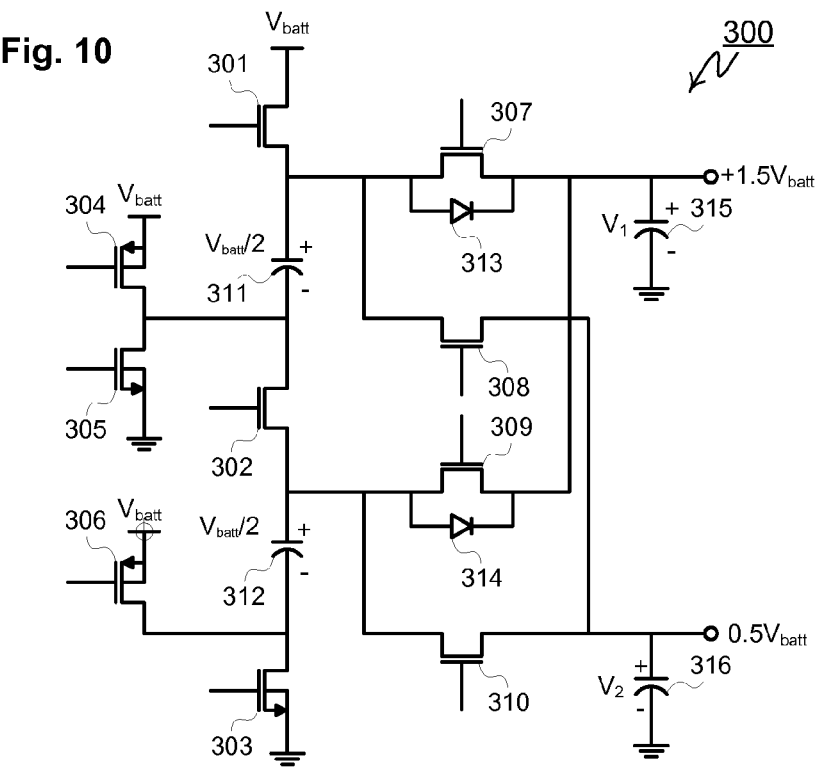
FIG. 10 is a schematic of a time-multiplexed fractional dual-positive-output charge pump.

Positive Multiple Output Time-Multiplexed-Capacitor Converters: In another embodiment of this invention, circuit 300 of FIG. 10 illustrates a time-multiplexed-capacitor dual-output converter capable of simultaneous producing two positive fractional outputs +1.5$V_{batt}$ and +0.5$V_{batt}$. The converter comprises a two flying capacitors 311 and 312, a matrix of MOSFETs 301 through 310, optional P-N diodes 313 and 314, and output filter capacitors 315 and 316.

Figure 11A:
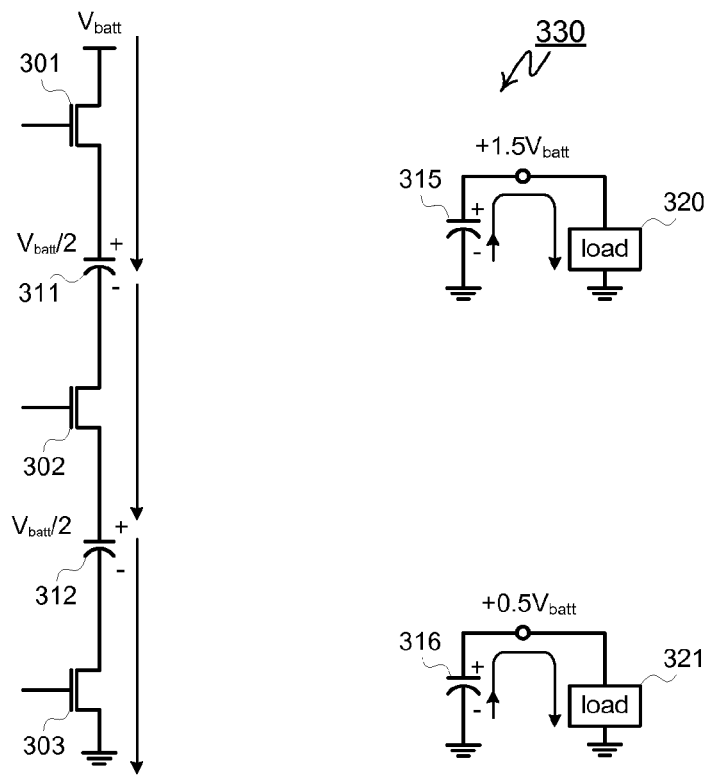
FIG. 11A shows the operation of a fractional dual-positive-output charge pump during flying cap charging.

As shown in the equivalent circuit 330 of FIG. 11A, operation first involves charging the flying capacitors 311 and 312 through conducting MOSFETs 301, 302 and 303. Since the flying capacitors are series connected each one charges to a voltage $V_{batt}/2$. All other MOSFETs remain off and all diodes remain reversed biased during this cycle. Output capacitors 315 and 316 must supply the current to loads 320 and 321 during charging phase 255.

Figure 11B:
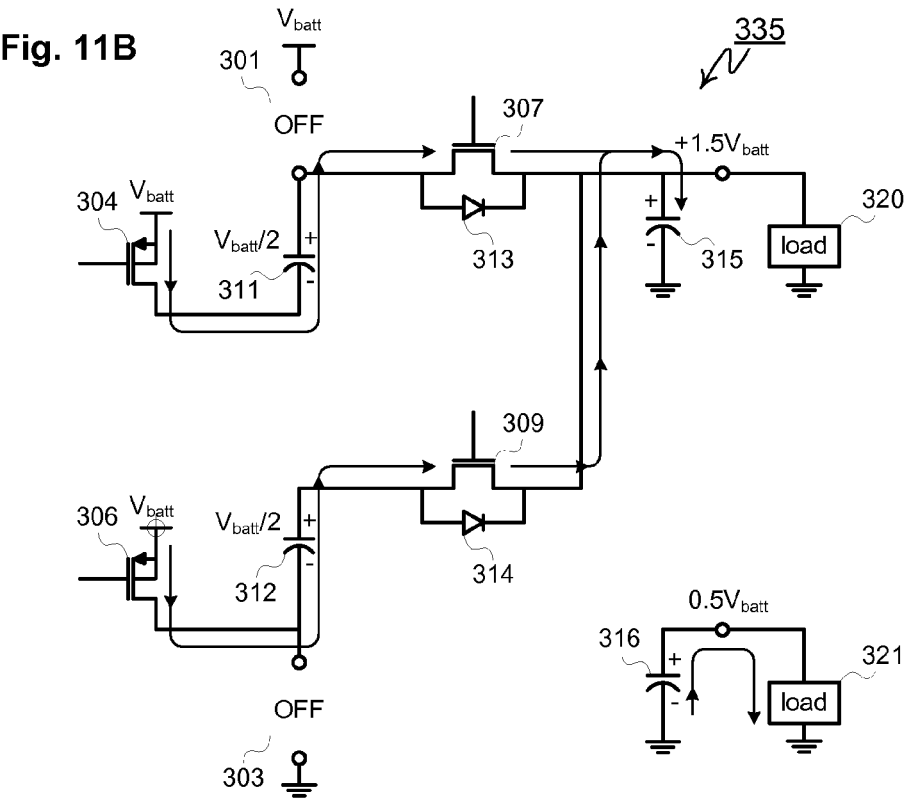
FIG. 11B shows the operation of a fractional dual-positive-output charge pump during charge transfer to its +1.5× output.

In the next phase shown by schematic 335 in FIG. 11B, charge is transferred from flying capacitors 311 and 312, connected in parallel, to the positive supply $V_{out1}$, its corresponding filter capacitor 315, and to load 320. Since the negative terminals of the charged flying capacitors are connected to $V_{batt}$ through on MOSFETs 304 and 306, then the positive terminal of both flying capacitors jumps to a voltage of ($V_{fly}+V_{batt}$) or 1.5$V_{batt}$. With its positive terminals connected to output capacitor 315 through conducting MOSFETs 307 and 309, the output voltage $V_{out1}$→+1.5$V_{batt}$ as filter capacitor 315 charges.

Optionally P-N diodes 313 and 314 intrinsic to MOSFETs 307 and 309 may be included depending on device construction, but must be oriented with their cathodes connected to the $V_{out1}$ terminal. In this phase of operation, all other MOSFETs remain off including 308 and 310. Because $V_{out2}$ is also positive, MOSFETs 308 and 310 must not include intrinsic diodes across their source to drain terminals. In one embodiment of this invention, a special body-bias-generator circuit is employed to eliminate the presence of the intrinsic diodes.

In a preferred embodiment, in the third phase of operation the charge pump returns the charging condition 330 of FIG. 11A where capacitors 311 and 312 are each charged to $V_{batt}/2$. The circuit then continues into the fourth operating phase shown by equivalent circuit 340 of FIG. 11C. In an alternate embodiment, the capacitor refresh operation can be skipped, transitioning directly from circuit 335 to 340 without replenishing charge on the flying capacitors 311 and 312.

Figure 11C:
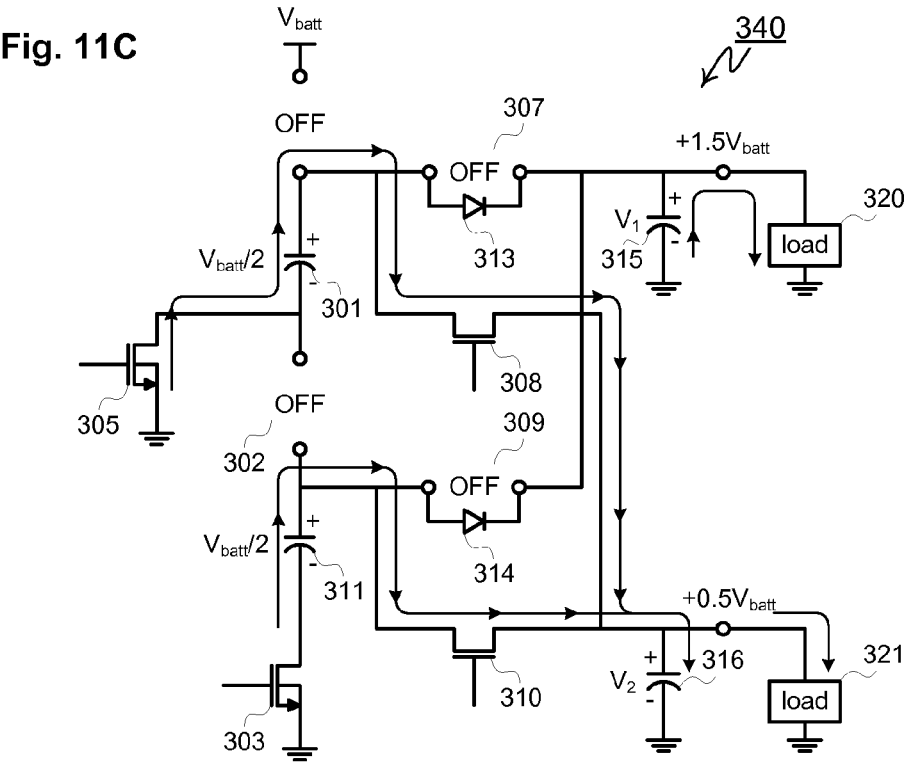
FIG. 11C shows the operation of a fractional dual-positive-output charge pump during charge transfer to its +0.5× output.

In the fourth and final phase shown by schematic 340 in FIG. 11C, charge is transferred from flying capacitors 311 and 312, connected in parallel, to a second positive supply $V_{out2}$, its corresponding filter capacitor 315, and to load 321. Since the negative terminals of the charged flying capacitors are connected to ground through on MOSFETs 305 and 303, then the positive terminals of both flying capacitors jumps to a voltage of (+$V_{fly}$) or +0.5$V_{batt}$. With its positive terminals connected to output capacitor 315 through conducting MOSFETs 308 and 310, the output voltage $V_{out2}$→+0.5$V_{batt}$ as filter capacitor 315 charges. In this phase of operation, all other MOSFETs remain off including 307 and 309. With $V_{out2}$<$V_{out1}$, diodes 313 and 314 also remain reverse biased.

Figure 11D:
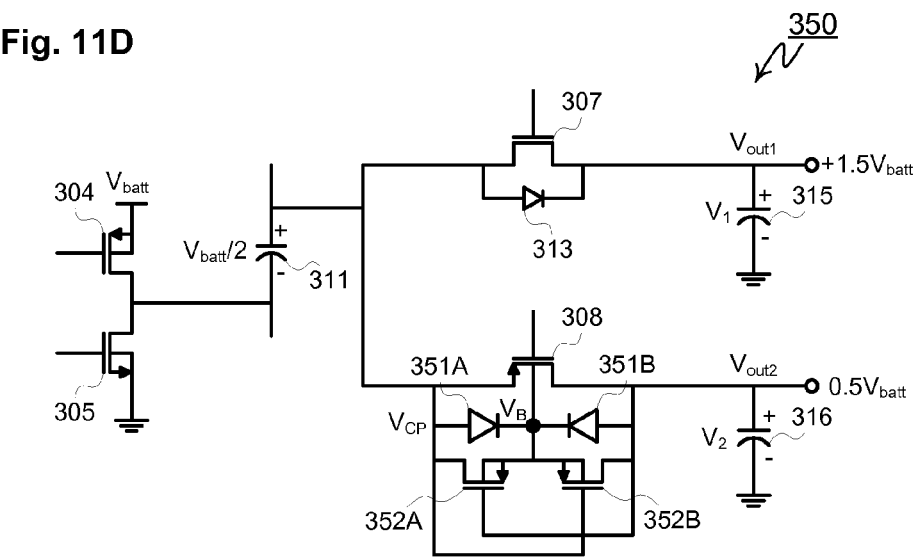
FIG. 11D shows a fractional dual-positive-output charge pump using an implementation of a P-channel body bias generator.
Figure 11E:
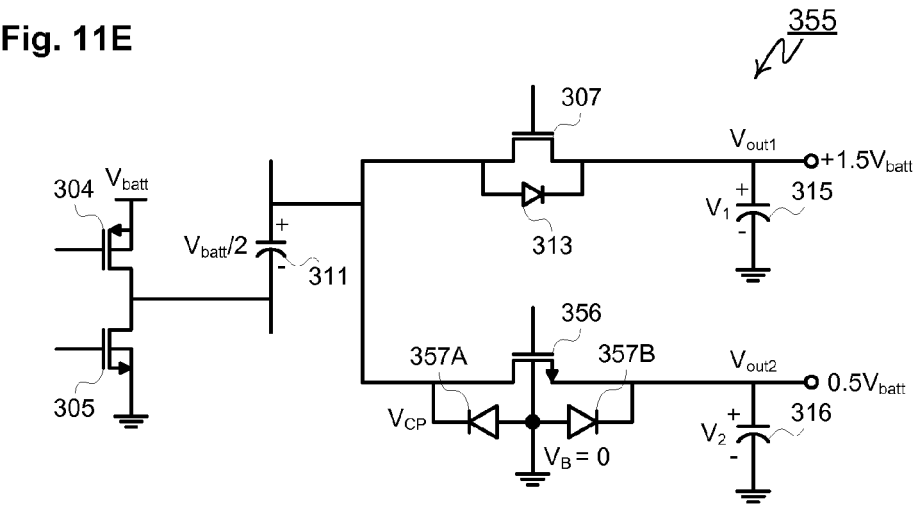
FIG. 11E shows a fractional dual-positive-output charge pump using grounded N-channel MOSFETs for charge transfer.
Figure 11F:
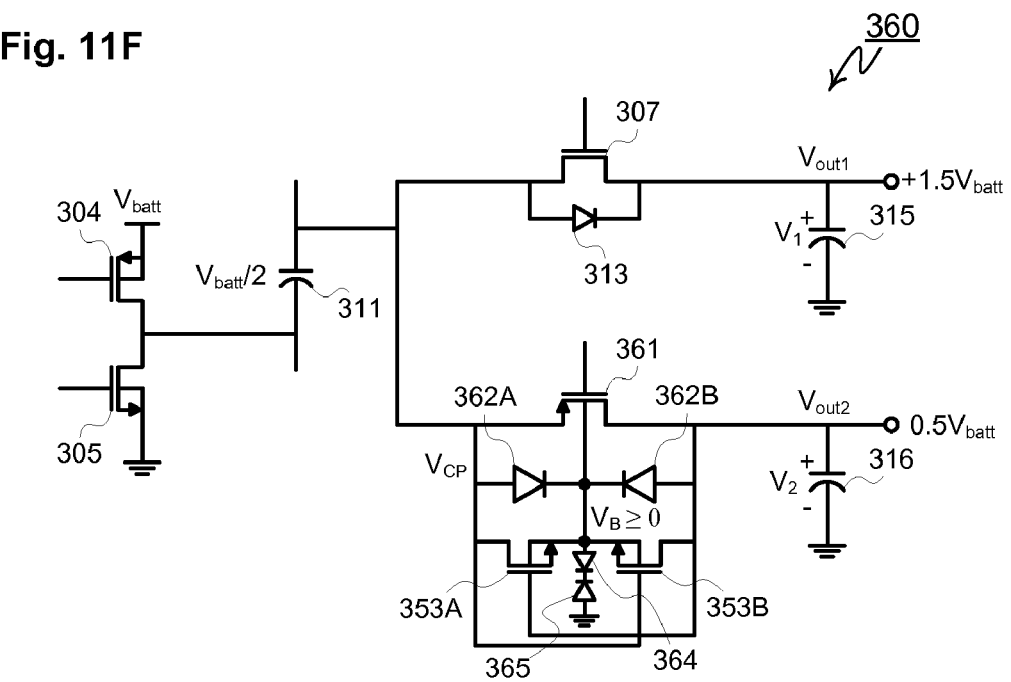
FIG. 11F shows a fractional dual-positive-output charge pump using an isolated N-channel body bias generator.

A necessary element of charge pump 300 or any a multiple positive-output time-multiplexed-capacitor charge pump, the charge transfer MOSFETs connecting the flying capacitors to any output except for the most positive one must be free from any source-to-drain parasitic diodes or diode conduction. Methods for eliminating source-to-drain diode conduction as illustrated by FIGS. 11D, 11E, and 11F are described in the following section of this application.

Figure 11G:
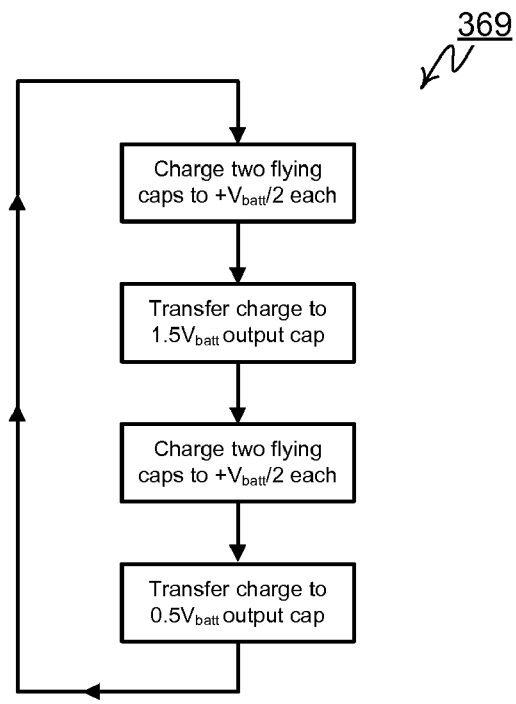
FIG. 11G is a flow chart showing the operation of a time-multiplexed fractional dual-positive-output charge pump.

In summary, operation of fractional dual-output time-multiplexed-capacitor converter 300 with a +1.5$V_{batt}$ and a +0.5$V_{batt}$ positive output is shown in flow chart 369 of FIG. 11G with an algorithm of alternately charging, transferring charge to a first positive output, charging, and transferring charge to a second positive, then repeating the sequence. For simplicity's sake, the steps of reconfiguring the MOSFETs between the various states are not shown explicitly.

Method to Eliminate Unwanted Source-Drain Diodes: One key feature of a time-multiplexed-capacitor dual-positive output converter is that only the MOSFETs connecting the flying capacitors to the most positive output may include intrinsic source-to-drain diodes. Specifically in converter 300, MOSFETs 308 and 310 connected to $V_{out2}$ do not include intrinsic P-N junctions parallel to their source drain terminals, while MOSFETs 307 and 309 connected to $V_{out1}$, the most positive output voltage, do. Specifically, with their cathodes connected to the highest output voltage $V_{out1}$, diodes 313 and 314 can never become inadvertently become forward biased except in the second phase 335 when capacitor 315 of $V_{out1}$ is being charged. If diodes were present across 308 and 310, the charge pump voltage would be limited ($V_{out2}+V_f$), where $V_f$ is the forward biased voltage of the P-N diodes, and would not function or otherwise be able to produce its higher output voltage +1.5$V_{batt}$.

Eliminating the P-N diode across MOSFETs 308 and 310 requires a special technique incompatible with conventional source-to-body shorted MOSFETs. These methods include employing an N-channel MOSFET with a grounded body connection, employing a P-channel MOSFET with its body tied to the highest positive voltage $V_{out2}$, or in a preferred embodiment to integrate a special "body bias generator" circuit with either a P-channel or an N-channel MOSFET that switches source-to-drain diode polarities to maintain reverse bias.

Such a method is illustrated in circuit 350 of FIG. 11D, where P-channel MOSFET 308 with intrinsic diodes 351A and 351B includes a body bias generator, or "BBG", comprising cross coupled P-channel MOSFETs 352A and 352B. The node labeled "$V_B$" represents the body or "back-gate" voltage of all three P-channel MOSFETs 308, 351A, and 351B. Operation of the BBG circuit involves two stable conditions as follows:

Whenever $V_{CP}$>$V_{out2}$, P-channel MOSFET 352A is conducting and 352B is off, connecting the body terminal $V_B$ of PMOS 308 to $V_{CP}$ and shorting out diode 351A. Configured in this way, diode 351B is electrically connected in parallel to the source drain terminals of P-channel 308. Since, the anode of diode 351B is permanently connected to $V_{OUT2}$ biasing its cathode to the more positive $V_{CP}$ potential reverse biases diode 351B and no diode conduction will occur. In the context of converter 300, the $V_{CP}$>$V_{out2}$ condition occurs whenever flying capacitor 311 is charged, PMOS 304 is conducting and NMOS 305 is off, regardless of the state of MOSFET 307, a state occurring whenever the flying capacitor is in one of its charge transfer cycles.

Conversely, Whenever $V_{OUT2}$>$V_{CP}$, P-channel MOSFET 352B is conducting and 352A is off, connecting the body terminal $V_B$ of PMOS 308 to $V_{OUT2}$ and shorting out diode 351B. Configured in this way, diode 351A is electrically connected in parallel to the source drain terminals of P-channel 308. Since, the anode of diode 351A is permanently connected to $V_{CP}$ biasing its cathode to the more positive $V_{CP}$ potential reverse biases diode 351A and no diode conduction will occur. In the context of converter 300, the $V_{out2} > V_{CP}$ condition occurs whenever flying capacitor 311 is charging, PMOS 304 is off and NMOS 305 is conducting, regardless of the state of MOSFET 307, a state occurring whenever the flying capacitor is in one of its charging cycles.

So using the BBG circuit technique, regardless of the polarity applied across P-channel MOSFET 308, the body terminal $V_B$ is biased so that no source-drain diode conduction occurs. With diode's 351A and 351B not conducting, current flow from flying capacitor 311 to output reservoir capacitor 316 is controlled by the gate voltage of MOSFET 308 and not by the forward biasing of P-N junction diodes. In contrast to MOSFET 307 with its intrinsic P-N diode 313, MOSFET 308 therefore has no source-to-drain diode. Whenever charge pump 350 is in charge transfer mode, i.e. with capacitor 311 charged and PMOS 304 conducting, current can be steered to either $V_{OUT1}$ and capacitor 315, or $V_{OUT2}$ and capacitor 316 depending on the gate control of MOSFETs 307 and 308. Current steering is fundamental to implementing a time multiplexed charge pump.

In circuit 350, if both MOSFETs 307 and 308 remain off, charge transfer to any output can only occur by the forward biasing of diode 313. The maximum voltage of node $V_{CP}$ is therefore limited to $V_{CP} \leq (V_{out} + V_f)$, where $V_f$ is the forward biased voltage of P-N diode 313. In a multiple positive-output time-multiplexed charge pump, only the highest most-positive voltage output can include a source-to drain diode. Any MOSFET connected to an output voltage $V_{OUT2}$ lower, i.e. less positive, than the highest output $V_{OUT1}$, must employ the BBG circuit to eliminate unwanted diode conduction.

As shown in circuit 350, P-channel 307 includes a parallel source-to-drain diode 313 while PMOS 308 does not. In an alternative embodiment diode 313 could also be eliminated by employing a body-bias-generator circuit for P-channel MOSFET 307 similar to the one used to drive the body of P-channel 308.

Another approach is to employ an N-channel MOSFET in place of P-channel 308 and optionally in place of P-channel 307. Using an N-channel MOSFET in place of a P-channel to eliminate the unwanted source-to-drain parallel diode may be implemented in one of two ways, either by permanently grounding the N-channel MOSFET's body terminal or by using a body-bias generator technique.

In circuit 355 of FIG. 11E, P-channel MOSFET 308 has been replaced with N-channel MOSFET 356. With its body grounded, $V_B = 0$ the anodes of intrinsic diodes 357A and 357B become permanently tied to ground. Provided the source or drain terminals of N-channel MOSFET remain biased at ground potential or above, i.e. $V_{CP} \geq 0$ and similarly $V_{OUT2} \geq 0$, then the cathodes of P-N diodes 357A and 358B will remain positive and the diodes will remain reverse biased and non-conducting, thereby eliminating unwanted source-to-drain diode conduction in N-channel MOSFET 356. Since the body of N-channel MOSFET 356 has its body terminal grounded, any non-isolated N-channel formed in a P-type substrate may be used to implement MOSFET 356.

In an alternative implementation N-channel MOSFET 361 is used to replace P-channel 308. As shown, the body of N-channel 361 is not grounded and its potential $V_B$ may float to a more positive voltage. Cross-coupled N-channel MOSFETs 363A and 363B along with intrinsic diodes 362A and 362B form a body-bias generator circuit to bias the N-channel body voltage $V_B$ so that no P-N diode conduction occurs. All three N-channel MOSFETs 361, 362A, and 362B are biased at the same potential, a voltage determined by the switching action of N-channel MOSFETs 363A and 363B. Body bias operation is similar to that of the aforementioned BBG circuit except that N-channel MOSFETs conduct with positive gate voltages where as the P-channel MOSFETs in circuit 350 turn-on only for negative gate-to-source bias potentials.

As such, during the charge transfer phase when $V_{CP} > V_{out2}$, N-channel 363B is turned on shorting-out intrinsic diode 362B and forcing $V_B = V_{out2}$, the more negative of the two applied potentials. At the same time, N-channel MOSFET 363A remains off. With the cathode of diode 362A biased to a more positive potential $V_{CP}$ than its body-connected anode biased at $V_B = V_{out2}$, then diode 362A remains reversed biased and non-conducting.

Conversely during the charging phase for flying capacitor 311 when $V_{out2} > V_{CP}$, N-channel MOSFET 363B is turned off and N-channel 363A conducts, shorting-out intrinsic diode 362A and forcing $V_B = V_{CP}$, the more negative of the two applied potentials. With the cathode of diode 362B biased to a more positive potential $V_{OUT2}$ than its body-connected anode biased at $V_B = V_{CP}$, then diode 362B remains reversed biased and non-conducting. So no matter which polarity is applied across the source-drain terminals of MOSFET 361, no P-N diode conduction occurs.

While circuit 360 represents the N-channel circuit counterpart to the P-channel BBG circuit shown in schematic 350, monolithic integration of N-channel version 360 into an integrated circuit requires special consideration. Specifically, most common CMOS integrated circuit processes employ a P-type substrate and a self-isolating N-type well. P-channel MOSFETs are fabricated in the N-well while N-channel are formed in the common P-type substrate or in a P-well formed in and shorted to said substrate. To implement circuit 360, however, the P-type body of N-channels 361, 362A and 362B must be isolated from their surrounding P-type substrate so that $V_B$ can float and is not hard-wired to ground. With a P-type body region separate from a grounded substrate, circuit 360 will function for any body voltages when $V_B \geq 0$.

Schematically, this isolation is represented by back-to-back P-N diodes 364 and 365 where the anode of diode 364 represents the isolated P-type floating region, well, or tub, the anode of diode 365 represents the P-type substrate or epitaxial layer, and the common cathode of diodes 364 and 365 describe the N-type isolation at potential $V_{ISO}$ surrounding the floating P-type region. Under normal operation $V_B \geq V_{ISO} \geq 0$, meaning that diode 364 is forward biased and $V_{ISO}$ will unless otherwise forced float to a positive potential approximately equal to $V_B$, and thereby reverse bias isolation diode 365.

Figure 12A:
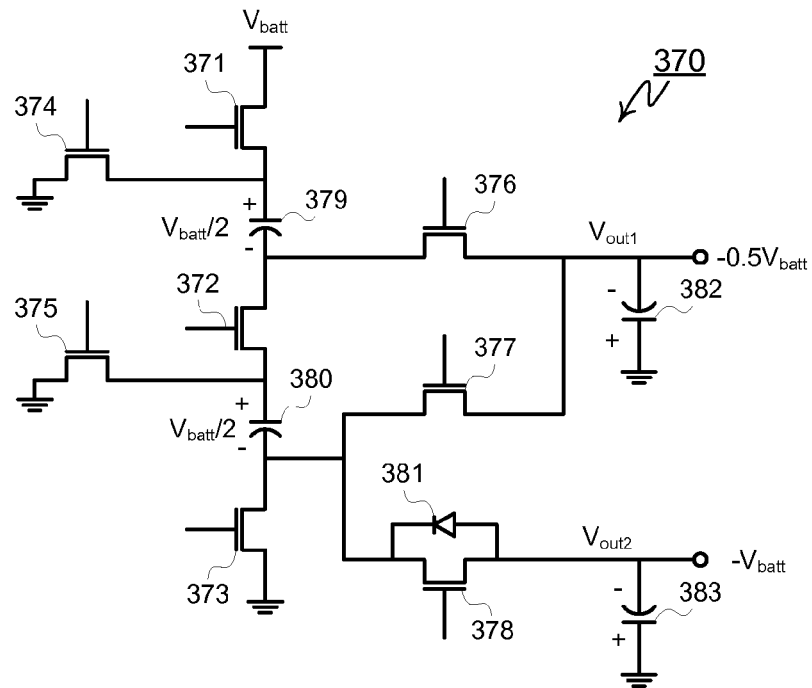
FIG. 12A shows a schematic for a −0.5×/−1× implementation of a time-multiplexed fractional dual-negative-output charge pump.

Multiple Negative Output Time-Multiplexed-Capacitor Converters: In another embodiment of this invention, circuit 370 of FIG. 12A illustrates a time-multiplexed-capacitor dual-output converter capable of simultaneous producing two negative fractional outputs $-0.5V_{batt}$ and $-V_{batt}$. The converter comprises two flying capacitors 379 and 380, a matrix of MOSFETs 371 through 378, optional P-N diode 381, and output filter capacitors 382 and 383.

As in prior fractional charge pump circuits, operation of converter 370 first involves charging flying capacitors 379 and 380 through conducting MOSFETs 371, 372 and 303. Since the flying capacitors are series connected each one charges to a voltage $V_{batt}/2$. All other MOSFETs remain off and all diodes remain reversed biased during this cycle. Output capacitors 382 and 383 must supply the current to any loads (not shown) during this charging phase.

Figure 12B:
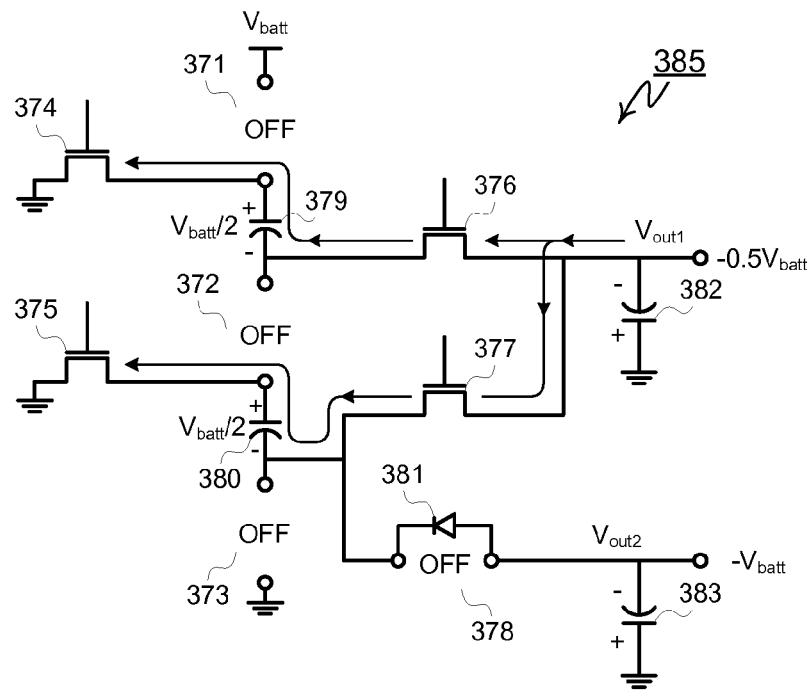
FIG. 12B shows operation of the charge pump of FIG. 12A during charge transfer to its −0.5× output.

In the next phase shown by schematic 385 in FIG. 12B, charge is transferred from flying capacitors 379 and 380, connected in parallel, to the negative supply $V_{out1}$, its corresponding filter capacitor 382, and to its electrical load (not shown). Since the positive terminals of the charged flying capacitors 379 and 380 are connected to ground through on MOSFETs 374 and 375, then the negative terminals of both flying-capacitors jump to a voltage of $(0-V_{fly})$ and $-V_{batt}/2$. With its negative terminals connected to output capacitor 382 through conducting MOSFETs 376 and 377, the output voltage $V_{out1}$, $\rightarrow -0.5V_{batt}$ as filter capacitor 382 charges. All other MOSFETs including MOSFET 378 remain off during this phase. Since $V_{out2} < V_{out1}$, meaning $V_{out2}$ is more negative of a potential, then with its anode connected to $V_{out2}$, P-N diode 381 remains reverse biased and non-conducting. But because $V_{out2}$ is also negative, MOSFETs 376 and 377 must not include intrinsic diodes across their source to drain terminals. In one embodiment of this invention, a special body-bias-generator circuit described previously in this application is employed to eliminate the presence of the intrinsic diodes.

In a preferred embodiment, in the third phase of operation the charge pump returns the charging condition where capacitors 379 and 380 are each charged to $V_{batt}/2$. The circuit then continues into the fourth operating phase shown by equivalent circuit 386 of FIG. 12C. In an alternate embodiment, the capacitor refresh operation can be skipped, transitioning directly from circuit 385 to 386 without replenishing charge on the flying capacitors 379 and 380.

Figure 12C:
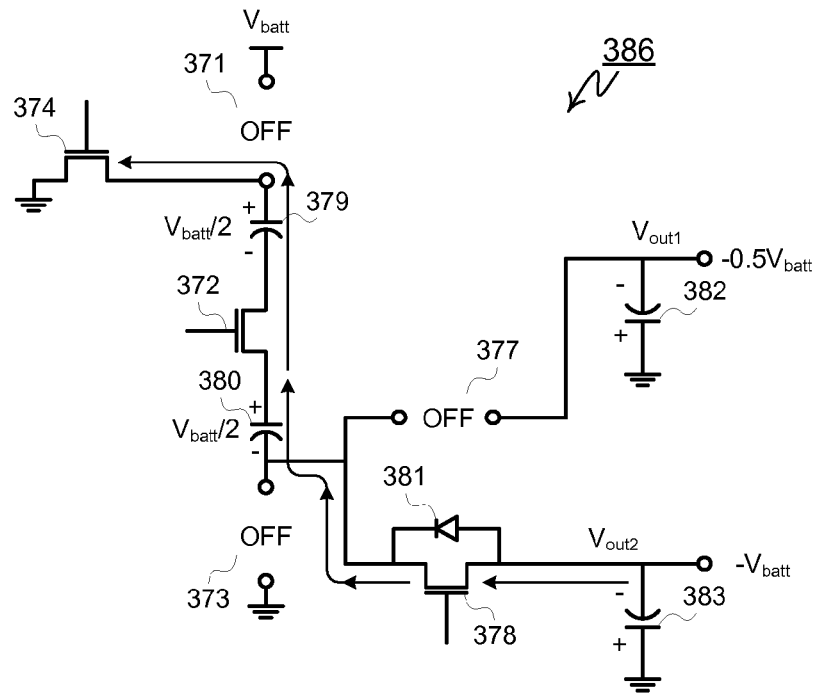
FIG. 12C shows operation of the charge pump of FIG. 12A during charge transfer to its −1× output.

In the fourth and final phase shown by schematic 386 in FIG. 12C, charge is transferred from flying capacitors 379 and 380, connected in series, to a second positive supply $V_{out2}$, its corresponding filter capacitor 383, and to its electrical load (not shown). Since the positive terminal of charged flying capacitor 379 is connected to ground through on MOSFET 374, and the positive terminal of flying capacitor 380 is connected to the negative terminal of flying capacitor 379 through conducting MOSFET 372, then the negative terminals of flying capacitor 380 must jump to a voltage of $(0-2V_{fly})$ or $-V_{batt}$. With its negative terminal connected to output capacitor 383 through conducting MOSFETs 378 and forward biased diode 381, the output voltage $V_{OUT2} \rightarrow -V_{batt}$ as filter capacitor 383 charges. In this phase of operation, all other MOSFETs remain off including 376 and 377.

A necessary element of charge pump 370 or any a multiple negative-output time-multiplexed-capacitor charge pump the charge transfer MOSFETs connecting the flying capacitors to any output except for the most negative one must be free from any source-to-drain parasitic diodes or diode conduction. Methods for eliminating source-to-drain diode conduction are similar to those illustrated by FIGS. 11D, 11E, and 11F for positive outputs, including the use of a body bias generator circuit.

Figure 12D:
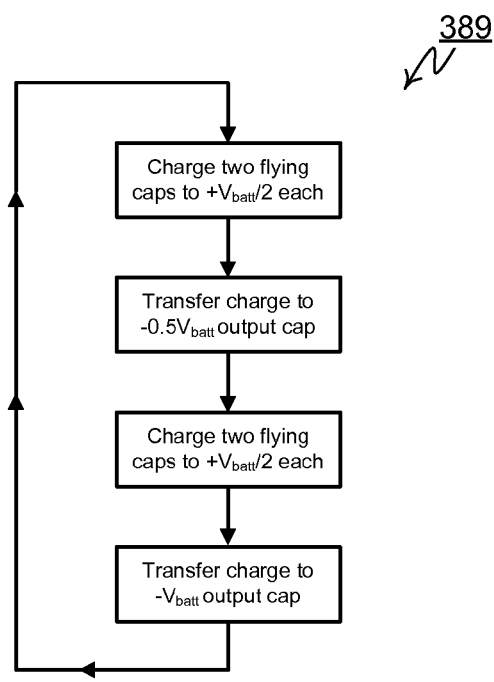
FIG. 12D is a flow chart showing operation of a fractional dual-negative-output charge pump.

In summary, operation of fractional dual-output time-multiplexed-capacitor converter 370 with a $-V_{batt}$ and a $-0.5V_{batt}$ negative output is shown in flow chart 389 of FIG. 12D with an algorithm of alternately charging, transferring charge to a first negative output, charging, and transferring charge to a second negative output, then repeating the sequence. For simplicity's sake, the steps of reconfiguring the MOSFETs between the various states are not shown explicitly.

In converter 370, the charge transfer from the flying capacitors to $V_{OUT1}$ shown in circuit 385 involves paralleling capacitors 379 and 380. In circuit 386, during charge transfer to $V_{OUT2}$, the capacitors are series connected. In this regard, the parallel combination in circuit phase 385 delivers more charge to output capacitor 382 than the series arrangement of circuit 386 is capable of delivering to $V_{OUT2}$. This means the $-0.5V_{batt}$ supply output $V_{OUT1}$ is capable of delivering higher output currents than the $-V_{batt}$ supply output $V_{OUT2}$.

Figure 12E:
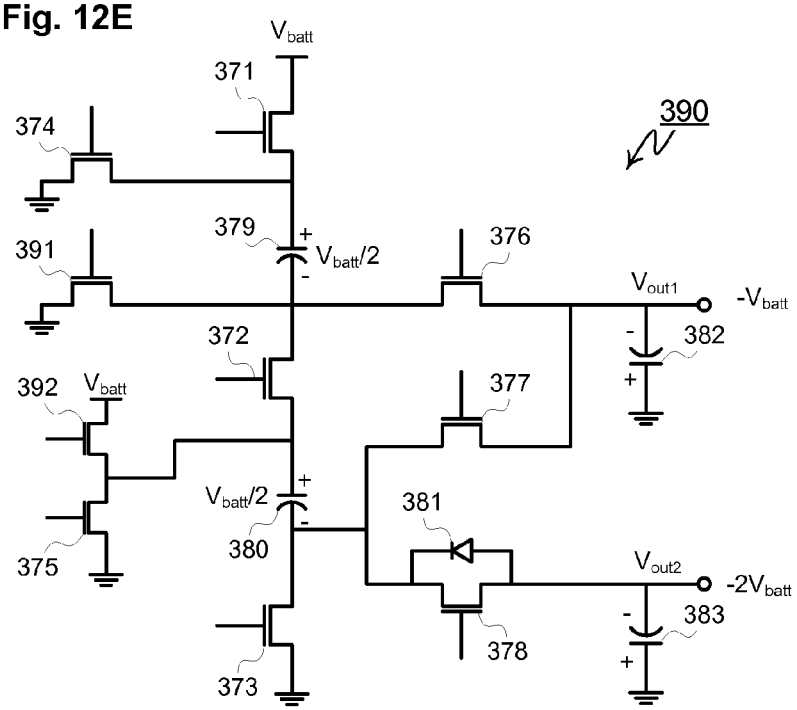
FIG. 12E shows modification of the flowchart of FIG. 12D for −1×/−2× outputs.

In another embodiment of this invention illustrated in circuit 390 of FIG. 12E, a modification of converter 370 produces two negative outputs having voltages $-V_{batt}$ and $-2V_{batt}$, both integer multiples of $V_{batt}$. By adding of MOSFETs 391 and 392, both flying capacitors can be charged to a potential of $V_{batt}$ instead of $V_{batt}/2$. Specifically during charging MOSFETs 371 and 391 are turned on and charge flying capacitor 379 to the potential $V_{batt}$ while simultaneously MOSFETs 392 and 373 are turned on and charge flying capacitor 380 to a potential $V_{batt}$. During charging all other MOSFETs remain off including MOSFET 372.

After charging both capacitors to $V_{batt}$ in the first phase of operation, output capacitor 382 is charged during a second phase of operation by the parallel combination of flying capacitors 379 and 380 and through conducting MOSFETs 374, 375, 376 and 377 to a voltage $V_{OUT} \rightarrow -V_{batt}$.

After a third phase when the flying capacitors are refreshed, MOSFETs 374, 372 and 378 are turned on forming a series combination of capacitors 379 and 380, where the positive terminal of capacitor 379 is connected to ground, the positive terminal of capacitor 380 is connected to the negative terminal of capacitor 379 through conducting MOSFET 372, and where the negative terminal of capacitor 380 is connected to output capacitor 383 which charges to $V_{OUT2} \rightarrow 2V_{batt}$.

Circuit 390 can therefore be operated in two different ways. If the flying capacitors are charged to $V_{batt}/2$, time multiplexing facilitates two output voltages, namely $-V_{batt}/2$ and $-V_{batt}$. If the flying capacitors are instead charged to $V_{batt}$, time multiplexing facilitates two higher output voltages, namely $-V_{batt}$ and $-2V_{batt}$. Because the converter is producing two outputs of the same polarity, MOSFETs 376 and 377 must be free of any parasitic source-to-drain diodes.

Figure 13A:
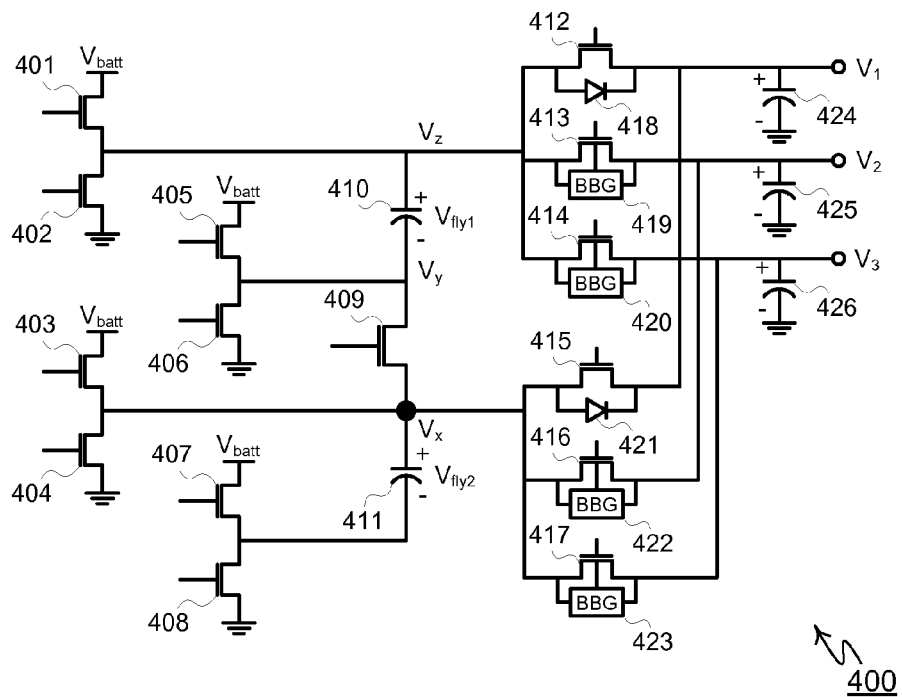
FIG. 13A shows a schematic of a time-multiplexed triple-output fractional charge pump.

Reconfigurable Multi-Output Time-Multiplexed Fractional Charge Pumps: The time-multiplexed-capacitor charge pump can be scaled for supplying several different voltages simultaneously, and can be electronically reconfigured to produce a different set of voltages. For example, FIG. 13A illustrates a triple-output reconfigurable charge pump 400 comprising flying capacitors 410 and 411, MOSFETs 401 through 409 and 412 through 417, output filter capacitors 424, 425 and 426, and body bias generator circuits 419, 420, 422 and 423. Intrinsic diodes 418 and 421 corresponding to MOSFETs 412 and 415 respectively are also included but may alternatively be substituted by BBG circuits.

The circuit topology of converter 400 comprises two H-bridges, one for each flying capacitor, a MOSFET for connecting the flying capacitors in series, and two MOSFET "triplets" used for control charge transfer to the converters three voltage outputs $V_1$, $V_2$, and $V_3$. In greater detail, capacitor 410 is biased at node voltages $V_z$ and $V_y$, where node $V_z$ is driven by a push-pull buffer comprising Vbatt-connected MOSFET 401 and grounded MOSFET 402, and where $V_y$ is driven by a push-pull buffer comprising $V_{batt}$-connected MOSFET 405 and grounded MOSFET 406. Together MOSFETs 401, 402, 405 and 406 form an H-bridge driving capacitor 410.

Similarly, capacitor 411 is biased at node voltages $V_x$ and $V_w$ where node $V_x$ is driven by a push-pull buffer comprising $V_{batt}$-connected MOSFET 403 and grounded MOSFET 404, and where $V_w$ is driven by a push-pull buffer comprising $V_{batt}$-connected MOSFET 407 and grounded MOSFET 408. Together MOSFETs 403, 404, 407 and 408 form an H-bridge driving capacitor 411. Node $V_x$ of capacitor 411 is also connected to node $V_y$ of capacitor 410 by MOSFET 409.

Charge-transfer MOSFETs 412, 413, and 414 together form a triplet connecting node $V_z$ of flying capacitor 410 to outputs $V_1$, $V_2$ and $V_3$ respectively. Similarly, charge-transfer MOSFETs 415, 416, and 416 together form a triplet connecting node $V_x$ of flying capacitor 411 to outputs $V_1$, $V_2$ and $V_3$ respectively. Outputs $V_1$, $V_2$ and $V_3$ correspond to filter capacitors 424, 425, and 426 respectively.

Operation of the MOSFET array can better be interpreted as a series of multiplexer switches, although the MOSFETs may in some circumstances be used to control capacitive charging currents. This functional interpretation of charge pump 400 is illustrated in circuit 430 of FIG. 13B, comprising for sets of single-pole triple-throw, or SP3T, switches 431, 432, 433, and 434: and two SP4T, i.e. single-pole four-throw, switches 435 and 436; flying capacitors 410 and 411; output caps 424 through 426; and optional diodes 418 and 421.

MOSFETs 401 and 402 comprise 1P3T switch 431 which in operation selects one of three inputs, $V_{batt}$ when MOSFET 401 is on, ground when MOSFET 402 is in its on state, or an open circuit when neither MOSFETs 401 or 402 are conducting. The output of multiplexer switch 431 biases node $V_z$ on flying capacitor 410. A second 1P3T switch 432 comprises MOSFETs 405 and 406, and in operation biases node $V_y$ on capacitor 410. In a similar configuration for biasing capacitor 411, MOSFETs 403 and 404 comprise 1P3T multiplexer switch 433 biasing node $V_x$ on flying capacitor 411. A second 1P3T switch 434 comprises MOSFETs 407 and 408, and in operation biases node $V_w$ on capacitor 411. MOSFET 409 is included for connecting capacitors 410 and 411 in series when needed.

The output of the node voltages $V_z$ and $V_x$ are selected and time multiplexed to supply energy to one of several outputs $V_1$, $V_2$ or $V_3$, transferring charge from flying capacitors 410 and 411 to output capacitors 424, 425, and 426. SP4T switch 435 is formed from the MOSFET triplet comprising devices 412, 413 and 414. SP4T switch 436 is formed from the MOSFET triplet comprising devices 415, 416 and 417. In a preferred embodiment each MOSFET triplet has only one device conducting at a time. The no-connect or NC switch position corresponds to the state where all three MOSFETs are off.

Operation is similar to the previous examples except that there are a greater number of combinations of inputs and outputs possible, primarily due to the flexible reconfigurable MOSFET matrix. Operation involves charging the flying capacitors, transferring charge to output $V_1$ and its capacitor 424, refreshing the flying capacitors, transferring charge to output $V_2$ and its capacitor 425, refreshing the flying capacitors again, transferring charge to output $V_3$ and its capacitor 426, then repeating the entire sequence again.

Figure 14:
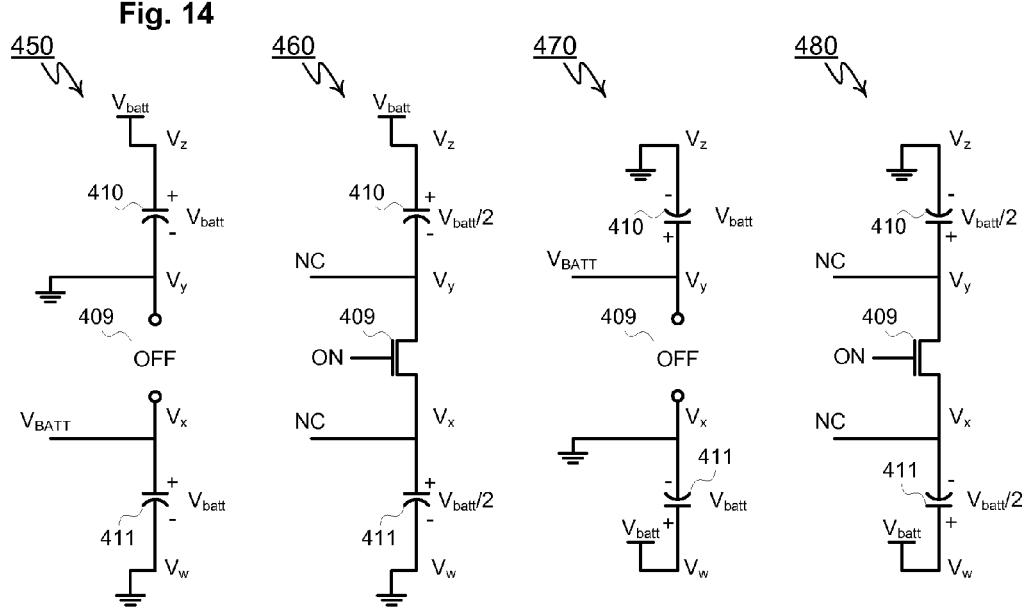
FIG. 14 shows the flying-capacitor conditions for the charge pump of FIG. 13A during operation.

Charging of the flying capacitors can be achieved in many ways using converter 400. A few of these combinations are illustrated in FIG. 14. In equivalent circuit 450, capacitors 410 and 411 are each charged to a voltage $V_{batt}$ where MOSFET 401 is on, $V_z=V_{batt}$, MOSFET 406 is on, $V_y=0$ and MOSFET 409 is off. Simultaneously, MOSFET 403 is on, $V_x=V_{batt}$, MOSFET 408 is on, and $V_w=0$. All other MOSFETs are off. This condition corresponds to having multiplexers 431 and 433 in their $V_{batt}$ position and multiplexers 432 and 434 in their grounded position. The flying capacitors are therefore charged in parallel to each other and equal in voltage to the battery input.

In equivalent circuit 460, capacitors 410 and 411 are each charged to a voltage $V_{batt}/2$ where MOSFET 401 is on, $V_z=V_{batt}$, MOSFET 409 is on, $V_y=V_x$, MOSFET 408 is on, and $V_w=0$. All other MOSFETs are off. This condition corresponds to having multiplexers 431 in its $V_{batt}$ position, multiplexers 432 and 433 in its NC position, and multiplexer 434 in its grounded position. The flying capacitors are therefore charged in series with one other and equal in voltage to one-half the battery input voltage.

In both charging circuits 450 and 460, the positively charged capacitor plates are connected to $V_z$ and $V_x$. The conditions $V_z > V_y$ and $V_x > V_w$ are defined herein as positive polarity charging. The MOSFET matrix and multiplexer can also charge capacitors in inverted polarity. In schematic 470, node $V_z$ and $V_x$ are biased to ground by conducting MOSFETs 402 and 404 while $V_y$ and $V_w$ are biased to $V_{batt}$ by on-state MOSFETs 405 and 407. As shown, flying capacitors 410 and 411 are charged in parallel but opposite in polarity relative to condition 450, i.e. they are charged to $-V_{batt}$. MOSFET 409 and all other devices remain off during charging.

Circuit 480 represents the fractional inverted charging condition where $V_z$ is biased to ground by on MOSFET 402; $V_w$ is biased to $V_{batt}$ by conducting MOSFET 407, and on-state MOSFET 409 forces $V_x=V_y$. Being series connected, each flying capacitor charges to half the battery voltage but relative to circuit 460, in inverted polarity, i.e. the capacitors are charge to a bias of $-V_{batt}/2$. Other charging conditions, e.g. where flying capacitor 410 is charge to a positive polarity while flying capacitor 411 is charged in its inverted polarity, also exist but are not included in the drawings.

Figure 15A:
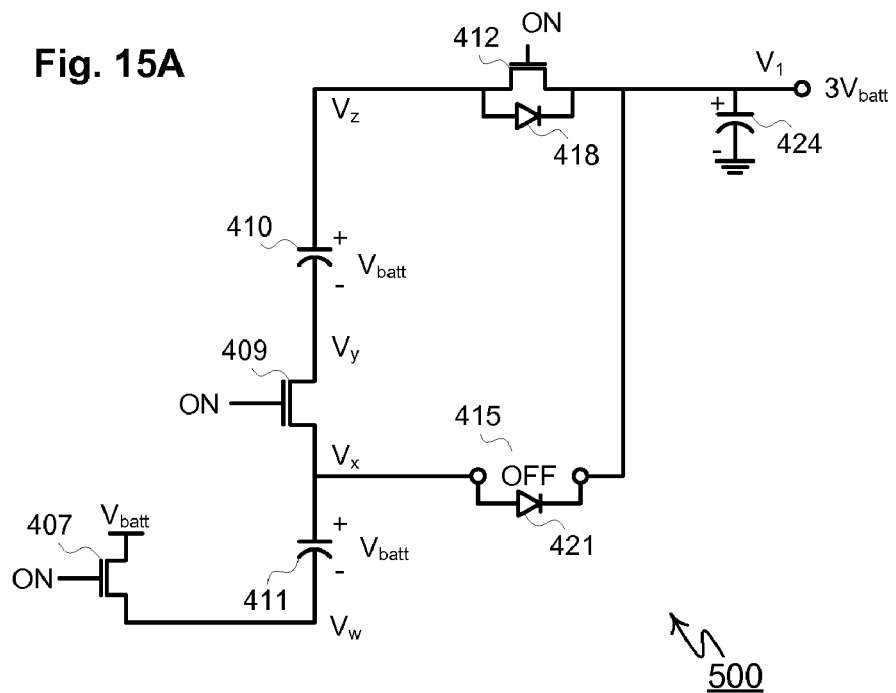
FIG. 15A shows the charge pump of FIG. 13A configured for integer multiple charge transfer and operating in tripler mode.

By charging the flying capacitors to the battery input bias $V_{batt}$, time multiplexed converter 400 can output two positive voltages and one negative voltage simultaneously, where the voltages comprise $3V_{batt}$, $2V_{batt}$ and $-V_{batt}$. FIG. 15A illustrates tripler 500 charge pump operation during charge transfer to output $V_1$ where the two flying capacitors, each charged to $V_{batt}$, are stacked on top one another and connected on top of the battery input by conducting MOSFETs 407, 409 and 412. Forward biased diode 418 in conjunction with conducting MOSFET 412 charges output capacitor 424 to a voltage $3V_{batt}$. All other MOSFETs including MOSFET 415 remain off. Because $V_{out1}$ represents the most positive output voltage diode 421 remains reversed biased and non-conducting. The node voltages of circuit 500 comprise $V_w=V_{batt}$, $V_x=V_y=2V_{batt}$, and $V_z=V_{out}=2V_{batt}$.

Figure 15B:
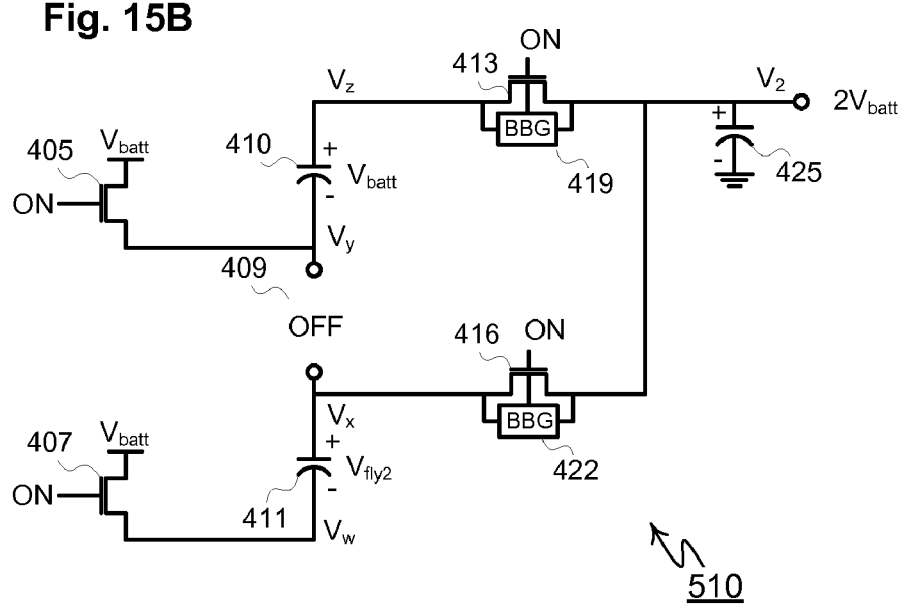
FIG. 15B shows the charge pump of FIG. 13A configured for integer multiple charge transfer and operating in doubler mode.

FIG. 15B illustrates doubler 510 charge pump operation during charge transfer to output $V_2$ where the two flying capacitors, each charged to $V_{batt}$, are connected in parallel and stacked on top of the battery input using conducting MOSFETs 405, 407, 413 and 416. Conducting MOSFETs 413 and 416 transfer their charge to capacitor 425 corresponding to output voltage of $2V_{batt}$. All other MOSFETs including MOSFET 409 remain off. Because $V_{out2}$ is not the most positive output voltage, MOSFETs 413 and 416 must utilize BBG circuitry 419 and 422 to prevent unwanted diode conduction.

Figure 15C:
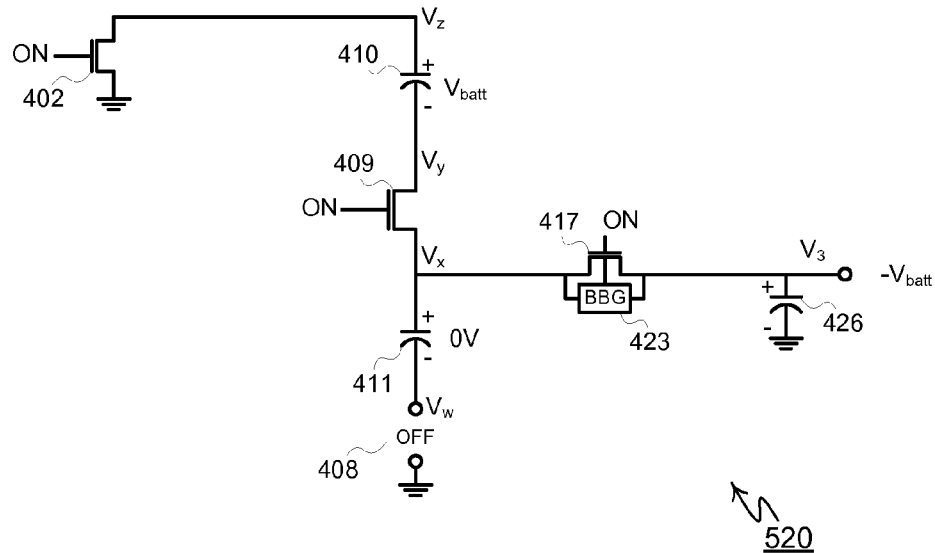
FIG. 15C shows the charge pump of FIG. 13A configured for integer multiple charge transfer and operating in inverter mode.
Figure 15D:
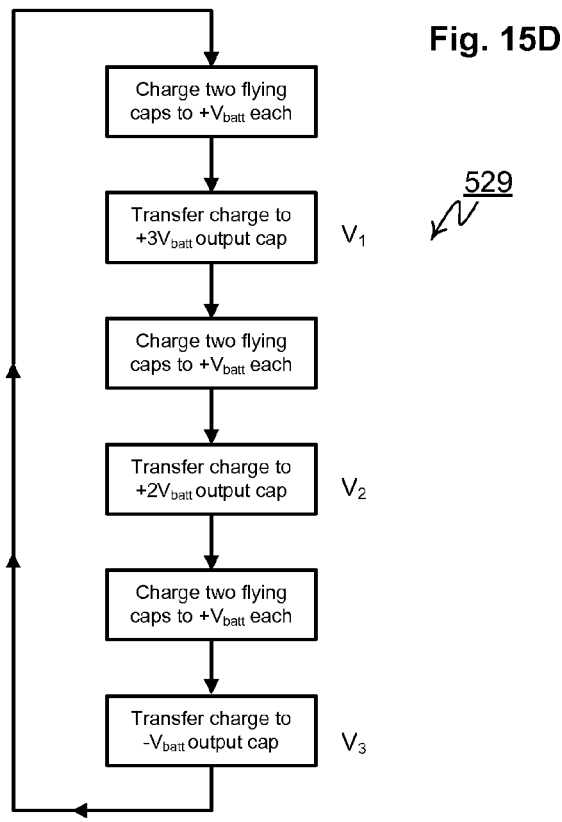
FIG. 15D is a flow chart showing the operation of the charge pump of FIG. 13A configured for integer multiple charge transfer.

FIG. 15C illustrates inverter 520 charge pump operation during charge transfer to output $V_3$ where the one flying capacitor, charged to $V_{batt}$, is biased below ground using conducting MOSFETs 402, 409, and 417. Conducting MOSFETs 417 transfers its charge to capacitor 426 corresponding to output voltage of $-V_{batt}$. All other MOSFETs including MOSFET 408 remain off. Because $V_3$ is not the most positive output voltage, MOSFETs 417 must utilize BBG circuitry 423 to prevent unwanted diode conduction. Capacitor 411 pre-charged to $V_{batt}$ is not charged, discharged or otherwise affected in this operating mode. The corresponding flow algorithm for the triple-output time-multiplexed capacitor charge pump with dual polarity output is shown in FIG. 15D.

Figure 16A:
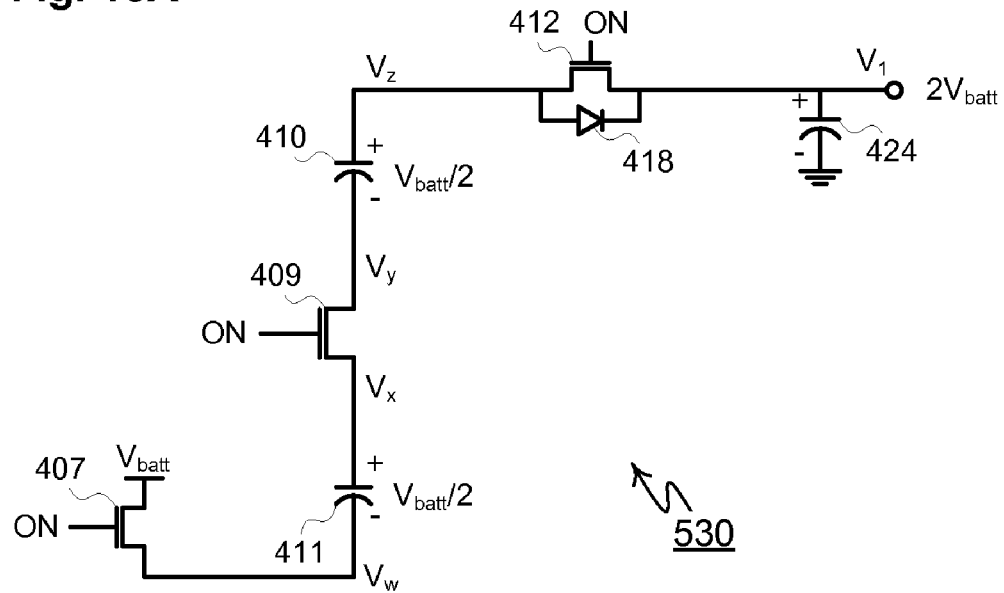
FIG. 16A shows the charge pump of FIG. 13A configured for fractional charge transfer and operating in doubler mode.

FIG. 16A illustrates doubler charge pump 530 operation during charge transfer to output $V_1$ where the two flying capacitors, each charged to $V_{batt}/2$ are stacked on top one another and connected on top of the battery input by conducting MOSFETs 407, 409 and 412. Forward biased diode 418 in conjunction with conducting MOSFET 412 charges output capacitor 424 to a voltage $2V_{batt}$. All other MOSFETs including MOSFET 415 remain off. Because $V_{out1}$ represents the most positive output voltage diode 421 remains reversed biased and non-conducting. The node voltages of circuit 530 comprise $V_w=V_{batt}$, $V_x=V_y=1.5V_{batt}$, and $V_z=V_{out}=2V_{batt}$.

Figure 16B:
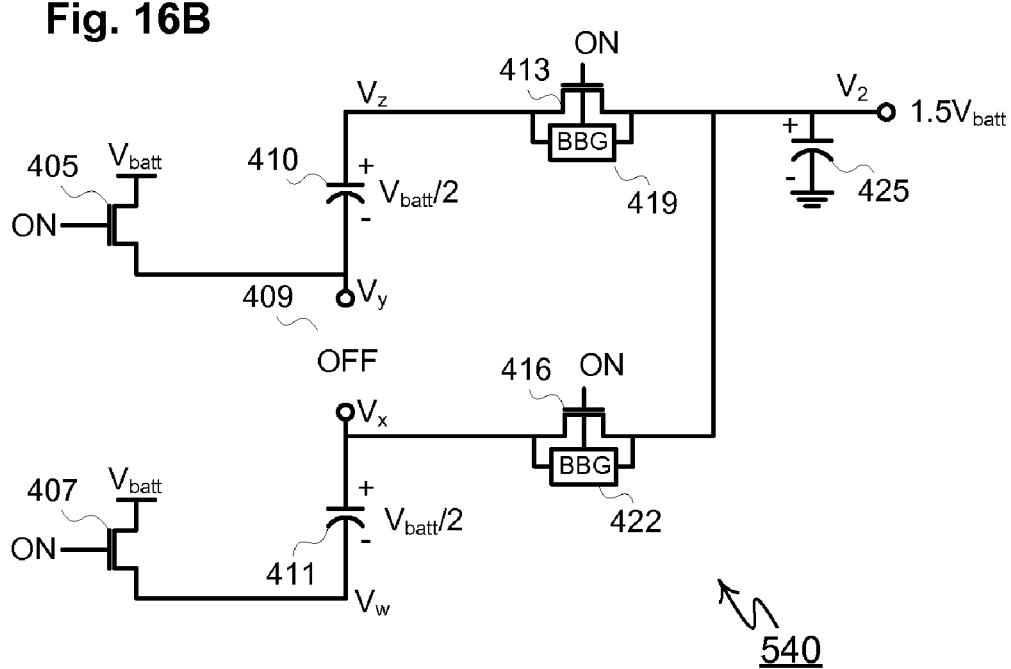
FIG. 16B shows the charge pump of FIG. 13A configured for fractional charge transfer and operating in 1.5×-type fractional mode.

FIG. 16B illustrates fractional charge pump 540 operation during charge transfer to output $V_2$ where the two flying capacitors, each charged to $V_{batt}/2$, are connected in parallel and stacked on top of the battery input using conducting MOSFETs 405, 407, 413 and 416. Conducting MOSFETs 413 and 416 transfer their charge to capacitor 425 corresponding to output voltage of $1.5V_{batt}$. All other MOSFETs including MOSFET 409 remain off. Because $V_{out2}$ is not the most positive output voltage, MOSFETs 413 and 416 must utilize BBG circuitry 419 and 422 to prevent unwanted diode conduction.

Figure 16C:
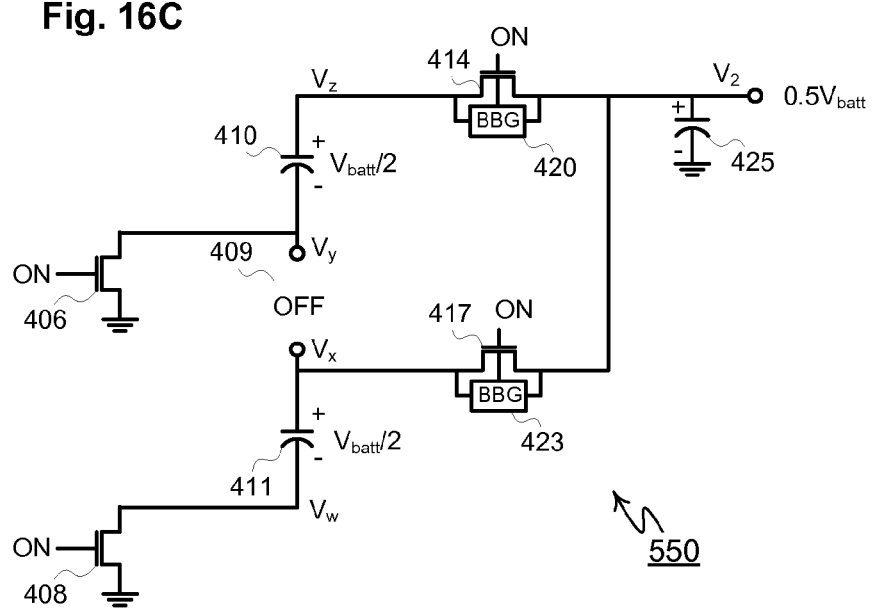
FIG. 16C shows the charge pump of FIG. 13A configured for fractional charge transfer and operating in 0.5×-type fractional mode.
Figure 16D:
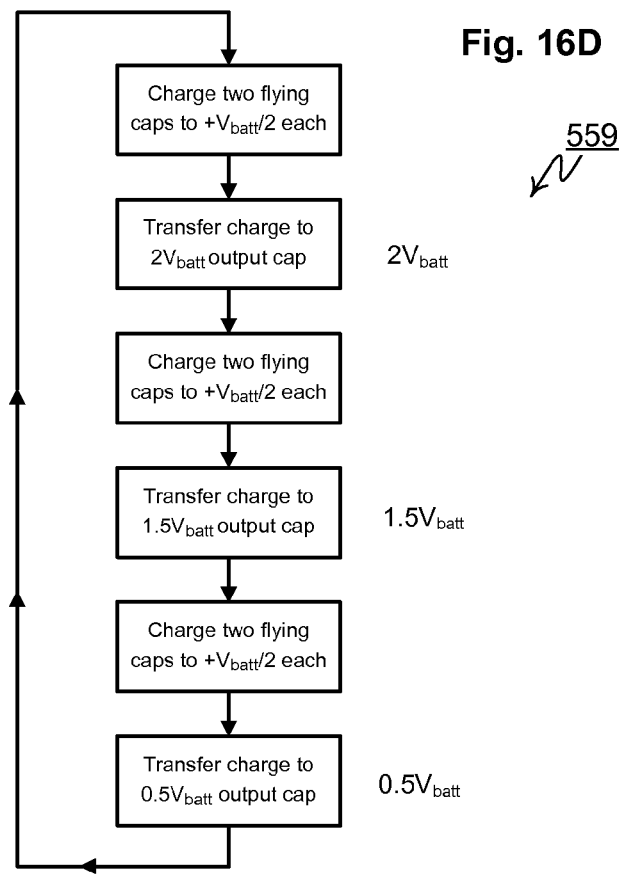
FIG. 16D is a flow chart showing the operation of the charge pump of FIG. 13A configured for fractional charge transfer.

FIG. 16C illustrates fractional charge pump 550 operation during charge transfer to output $V_3$ where the two flying capacitors, each charged to $V_{batt}/2$, are connected in parallel and connected on top of the ground potential using conducting MOSFETs 406, 408, 414 and 417. Conducting MOSFETs 414 and 417 transfer their charge to capacitor 426 corresponding to output voltage of $0.5V_{batt}$. All other MOSFETs including MOSFET 409 remain off. Because $V_{out3}$ is not the most positive output voltage, MOSFETs 414 and 417 must utilize BBG circuitry 420 and 423 to prevent unwanted diode conduction. The corresponding flow algorithm 559 for the fractional triple-output time-multiplexed capacitor charge pump is shown in FIG. 16D.

Figure 16E:
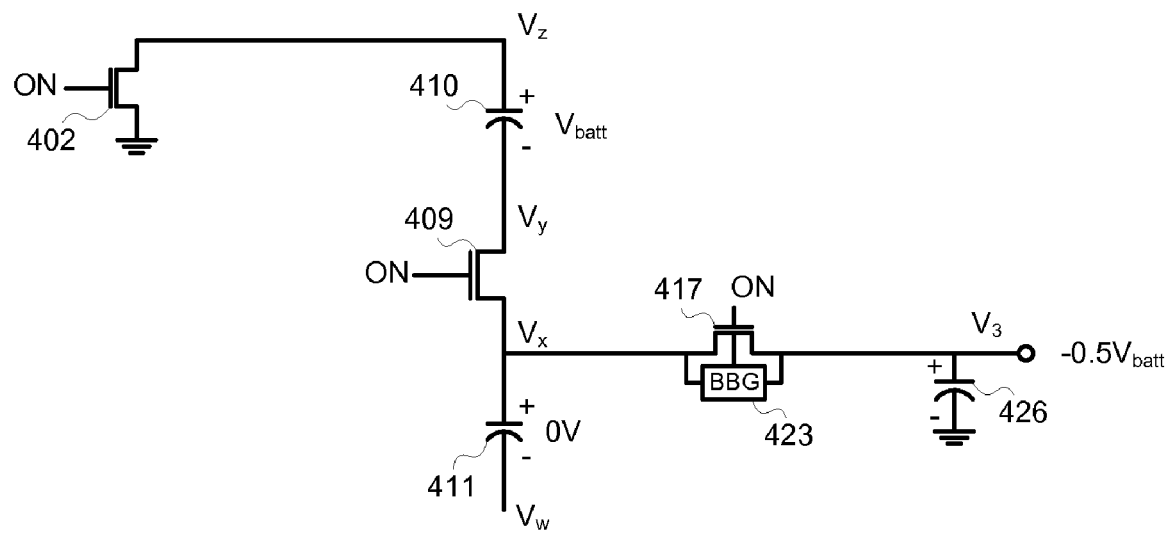
FIG. 16E shows the charge pump of FIG. 13A configured for fractional charge transfer and operating in −0.5×-type inverting-fractional mode.

FIG. 16E illustrates the limitation of converter 400 in producing a fractional negative output voltage $-0.5V_{batt}$ from a capacitor charged to a positive $0.5V_{batt}$. The complication comes from the fact that both flying capacitors 410 and 411 must be charged to be biased to $V_{batt}/2$. In the charge transfer circuit 560 of FIG. 16E however, capacitor 411 remains floating. While MOSFETs 402 409 and 417 create a path to transfer charge from flying capacitor 410 to output 426, capacitor 411 can not have its positive terminal biased to ground or connect $V_w$ to the output without the need for additional MOSFET circuitry. One solution is to discharge capacitor 410 before charging refreshing capacitor 410, but this action lowers efficiency of the converter.

Figure 17A:
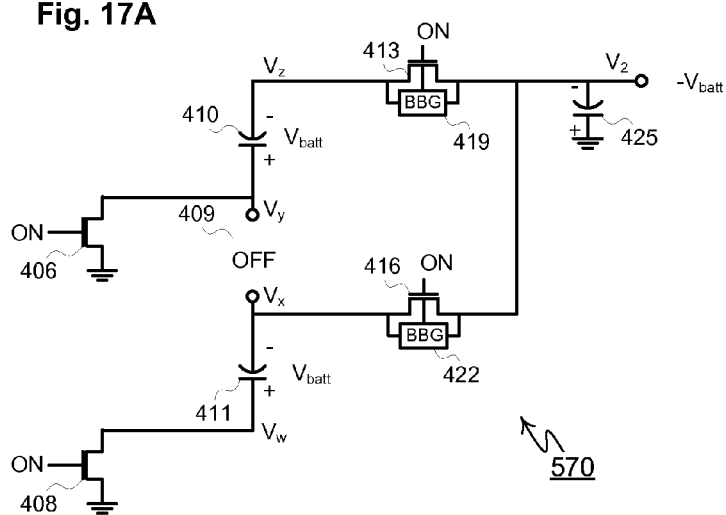
FIG. 17A shows the charge pump of FIG. 13A configured for integer multiple charge transfer and operating in −1×-type inverting mode.

FIG. 17A illustrates inverter 570 charge pump operation during charge transfer to output $V_2$ where the two flying capacitor, both charged to $V_{batt}$, are connected in parallel and biased below ground using conducting MOSFETs 406, 408, 413 and 416. Conducting MOSFETs 413 and 416 transfer their charge to capacitor 425 corresponding to output voltage of $-V_{batt}$. All other MOSFETs including MOSFET 409 remain off. As shown, MOSFETs 413 and 422 utilize BBG circuitry 419 and 422 to prevent unwanted diode conduction.

Figure 17B:
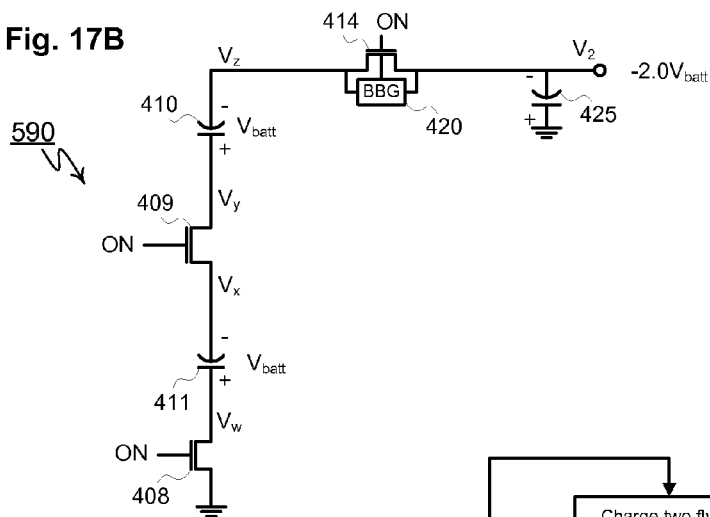
FIG. 17B shows the charge pump of FIG. 13A configured for integer multiple charge transfer and operating in 1-2×-type inverting mode.
Figure 17C:
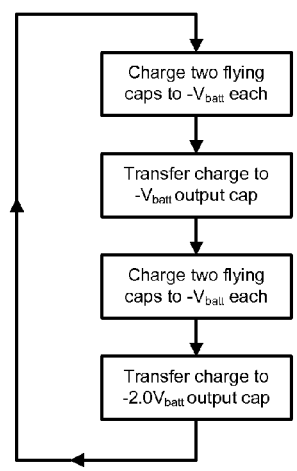
FIG. 17C is a flow chart showing the operation of the charge pump of FIG. 13A configured for negative integer multiples of input voltage.

FIG. 17B illustrates inverter 590 charge pump operation during charge transfer to output $V_3$ where the two flying capacitor, both charged to $V_{batt}$, are connected in series and biased below ground using conducting MOSFETs 408, 409, and 414. Conducting MOSFETs 414 transfers its charge to capacitor 426 corresponding to output voltage of $-2V_{batt}$. All other MOSFETs including MOSFET 417 remain off. As shown, MOSFET 414 utilizes BBG circuitry 423 to prevent unwanted diode conduction. The corresponding flow algorithm 599 for the dual-output time-multiplexed capacitor charge pump with inverting outputs is shown in FIG. 17C.

Figure 18A:
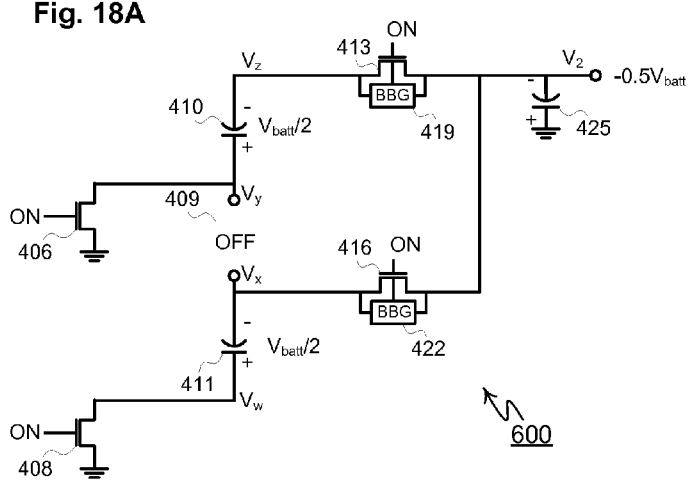
FIG. 18A shows the charge pump of FIG. 13A configured for fractional charge transfer and operating in −0.5×-type inverting mode.

FIG. 18A illustrates inverter 600 charge pump operation during charge transfer to output $V_2$ where the two flying capacitor, both charged to $V_{batt}/2$ are connected in parallel and biased below ground using conducting MOSFETs 406, 408, 413 and 416. Conducting MOSFETs 413 and 416 transfer their charge to capacitor 425 corresponding to output voltage of $-V_{batt}/2$. All other MOSFETs including MOSFET 409 remain off. As shown, MOSFETs 413 and 422 utilize BBG circuitry 419 and 422 to prevent unwanted diode conduction.

Figure 18B:
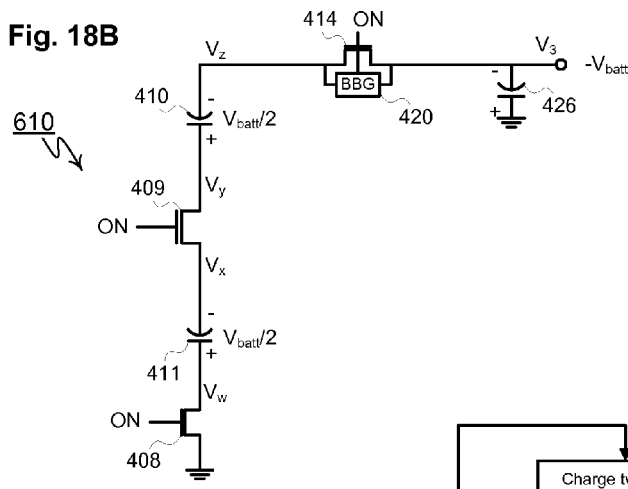
FIG. 18B shows the charge pump of FIG. 13A configured for fractional charge transfer and operating in −1×-type inverting mode.
Figure 18C:
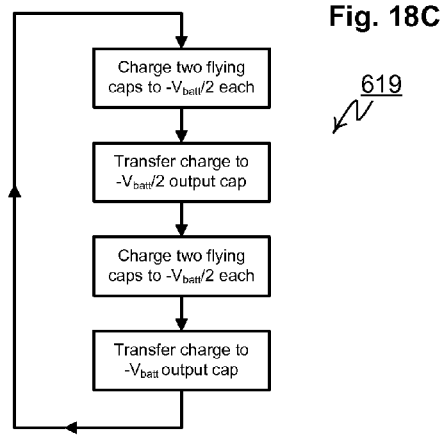
FIG. 18C is a flow chart showing the operation of the charge pump of FIG. 13A configured for negative fractional multiples of input voltage.

FIG. 18B illustrates inverter 610 charge pump operation during charge transfer to output $V_3$ where the two flying capacitor, both charged to $V_{batt}/2$, are connected in series and biased below ground using conducting MOSFETs 408, 409, and 414. Conducting MOSFETs 414 transfers its charge to capacitor 426 corresponding to output voltage of $-V_{batt}$. All other MOSFETs including MOSFET 417 remain off. As shown, MOSFET 414 utilizes BBG circuitry 420 to prevent unwanted diode conduction. The corresponding flow algorithm 619 for the dual-output time-multiplexed-capacitor charge pump with fractional inverting outputs is shown in FIG. 18C.

Figure 19A:
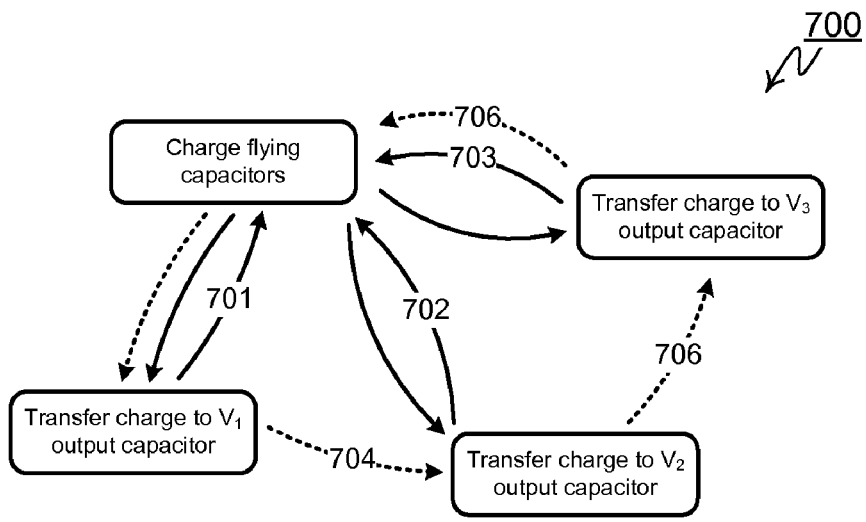
FIG. 19A is a generalized state diagram of multi-output charge pump operation during repeated refresh.

Algorithmic Considerations in Time-Multiplexed-Capacitor Charge Pumps: Regardless of the voltage, polarity, and number of outputs, time multiplexing of a charge pump follows a simple algorithm 700 shown in FIG. 19A. This algorithm involves the steps of charging the flying capacitors, transferring charge from the flying capacitors to a first output at voltage $V_1$, returning to the original state 701 and refreshing the flying capacitor's charge, transferring charge from the flying capacitors to a second output at voltage $V_2$, returning to the original state 702 and refreshing the flying capacitor's charge, transferring charge from the flying capacitors to a third output at voltage $V_3$, returning to the original state 703 and refreshing the flying capacitor's charge, and so on up to "n" states, then repeating the multiplexing sequence. This sequence is shown by the solid lines and arrows in flow chart 700.

The dotted lines and arrows in flow chart 700 represent an alternative flow where the flying capacitors are not refreshed between charge transfers but instead charge several output capacitors before returning to refresh the flying capacitors. Specifically in such an algorithm, the converter charges the flying capacitors, transfers charge from the flying capacitors to a first output at voltage $V_1$, then following transition 704 transfers charge from the flying capacitors to a second output at voltage $V_2$, followed by transition 705 transferring charge from the flying capacitors to a third output at voltage $V_3$, and only thereafter returns by transition 706 to refresh the flying capacitors.

While either algorithm, the theoretical number of converted voltages may be adapted for "n" outputs. One limitation of this approach is output ripple increases in proportion with "n", the number of outputs—the greater the number of outputs, the greater the output ripple of any given output will be. Also any algorithm that doesn't regularly refresh the flying capacitors will suffer more voltage sag on the flying capacitors, which in turn further degrades ripple. Conversely, refreshing the flying capacitors more often reduces the frequency by which a given output's filter capacitor is refreshed.

In one embodiment of this invention, ripple is minimize by matching the algorithm to the output's ripple requirements, i.e. choosing an algorithm where the outputs charged last or the least often power loads that tolerate the highest degree of ripple. In the dotted line algorithm of state diagram 700 comprising transitions 704, 705, and 706, for example, the flying capacitors exhibit their greatest voltage sag during charge transfer to the $V_3$ output capacitor, the last output to be recharged before the flying capacitors are refreshed by transition 706. As such the ripple specification for $V_3$ should be worse than $V_2$ and the load and specification should be matched accordingly. In comparison, the $V_1$ output, the first charge transfer after refreshing the flying capacitors, will exhibit the lowest ripple. Ripple may be also be reduced by increasing the size of the output capacitors, but with the disadvantage of some incremental cost.

Figure 19B:
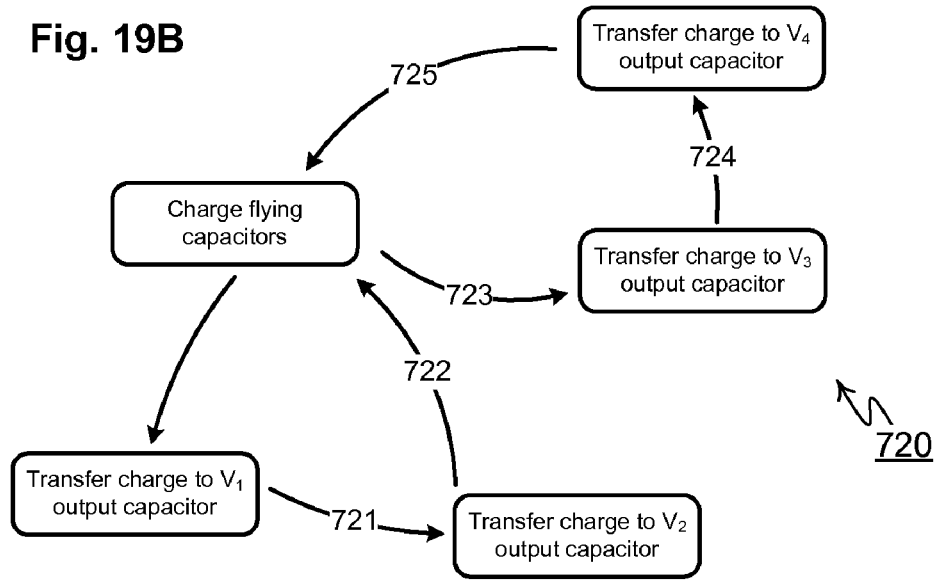
FIG. 19B is a generalized state diagram of multi-output charge pump operation during partial refresh.

One compromise to the tradeoff between voltage sag in the flying capacitors versus recharge rate of a specific output voltage is shown in FIG. 19B. In algorithm 720, four outputs $V_1$ through $V_4$ are powered by a time-multiplexed-capacitor charge pump. As shown, after charging the flying capacitors and supplying charge to the $V_1$ output capacitor, state change 721 then supplies charge to the $V_2$ output capacitor before returning to the condition to refresh the flying capacitors. After refreshing the flying capacitors transition 723 powers the $V_3$ output capacitor, followed by transition 724 to transfer charge to the $V_4$ output capacitor, the converter then returns by transition 725 back to its initial state. The entire cycle repeats itself.

Figure 19C:
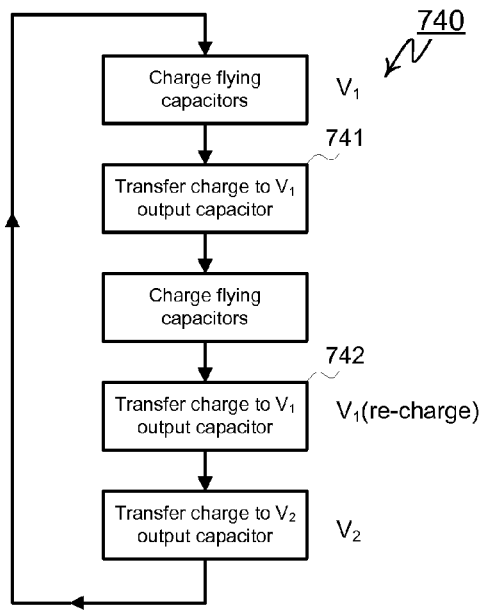
FIG. 19C is a flowchart showing a method for variable charge transfer for a multi-output charge pump.

As is often the case in electronic systems not every power supply must meet strict ripple and regulation requirements, often because some electrical loads are tolerant to noise or do not exhibit significant current transients. In the event that some outputs exhibit larger load current transients than others, the algorithm can be adjusted to re-charge noisy and changeable outputs more often. Such an algorithm is represented in flow chart 740 of FIG. 19C where the $V_1$ output capacitor is refreshed twice per cycle, charge transfer steps 741 and 742, while the $V_2$ output is charged only once. In this algorithm however, $V_2$ is charged from flying capacitors which may have sagged from the charge transfer operation 742 immediately preceding it.

Figure 19D:
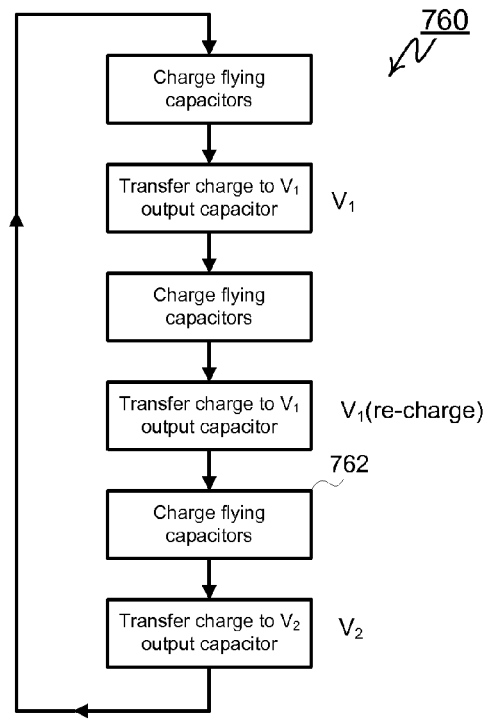
FIG. 19D is a flowchart showing an improved method for variable charge transfer for a multi-output charge pump.

In an alternate algorithm 760 shown in FIG. 19D, the flying capacitors are refreshed 761 just prior to charge transfer to the $V_2$ output to reduce $V_{fly}$ voltage sag. Like algorithm 740 however, the $V_1$ output capacitor is re-charged from the flying capacitors at twice the rate of the $V_2$ output capacitor.

The disadvantage of all the aforementioned algorithms is they redistribute energy from the flying capacitors to the various multiplexed outputs without any consideration of load conditions. Such algorithms exhibit "blind distribution" of the converter's energy allocation. While it is true that the various voltage outputs will not transfer charge from the flying capacitors to their output capacitor unless it is needed, a fixed time is none-the-less allocated to do so. Meanwhile other outputs experiencing large load current transients and voltage deviations cannot react and are not allocated longer transfer times in order to react more quickly. Conversely, however, variable charge transfer times for each output will result in variable frequency operation and a varying noise spectrum—an undesirable characteristic in many electronic systems, especially those related to communication.

A fixed frequency algorithmic method remedies this problem whereby, in an alternative embodiment of the invention, a time-multiplexed-capacitor multiple output charge pump uses feedback to dynamically adjust the converter's algorithm to respond to rapid charge in the load condition of specific voltage outputs. Algorithm 780 shown in FIG. 19E describes a time-multiplexing technique where the output capacitor for a critical $V_1$ output is recharged multiple times until the output voltage is within a specified tolerance.

The conditional test 781 determines whether another charge pump cycle of charging the flying capacitors and transferring charge to the $V_1$ capacitor is needed or if normal operation may resume, where the $V_2$ output capacitor is to be charged in alternating sequence with the $V_1$ output. This conditional test requires monitoring of the $V_1$ output voltage either by using an analog comparator or by using digital control fed by an analog-to-digital converter, herein referred to as by the acronym ADC or A/D.

Conditional test 782 insures that $V_2$ occasionally is re-charged even during a $V_1$ load transient. Counter 783 counts the number of times the flying capacitors transfer charge to the $V_1$ output. So long that the counter does not exceed some pre-defined value "n", which may for example be 2, 3, or many more times, then the charge pump will continue to refresh the flying capacitors and transfer its charge to the $V_1$ output capacitor. If the count does, however, exceed "n" then the converter is diverted to re-charge $V_2$, even though $V_1$ has not yet reached its defined tolerance range. Each time that a charge transfer to $V_2$ occurs, the counter is reset to zero by step 784 and the entire cycle repeated.

Under normal operation, algorithm 780 charges the $V_1$ and $V_2$ output capacitors in alternating fashion. While compatible with variable frequency operation, algorithm 780 works equally well with fixed frequency charge pump operation. In the event of a $V_1$ load transient, the system adapts to deliver more charge to the critical output by incrementing the charge transfer to $V_1$ by some integer number of cycles. In a preferred embodiment this adaptive response still occurs at a fixed clock rate. Algorithm 780 evaluates the condition of $V_1$ every charging cycle.

Figure 20:
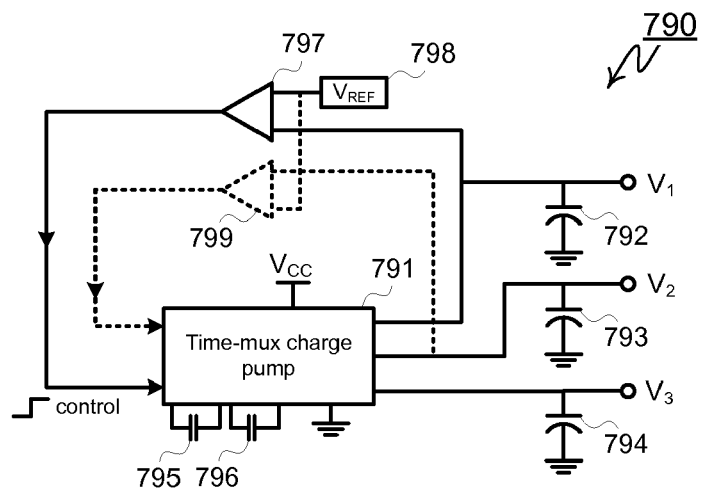
FIG. 20 is a block diagram of a feedback controlled multi-output charge pump.

The algorithm 780 can be similarly modified for three or more output voltages $V_1$, $V_2$, and $V_3$ as shown in circuit 790 of FIG. 20 combining charge pump 791, time multiplexed capacitors 795 and 796, and output capacitors 792, 793, and 794. If only output $V_1$ is sensitive to load transients, the system hardware can be implemented with a voltage reference 798 and comparator 797 to provide feedback to the logic inside the time multiplexed charge pump 791.

If two voltages require feedback for improved response time, a second comparator 799 can be added, but consideration must be given to the hierarchical priority given to each voltage output in the algorithm. For example if the highest priority is given to $V_1$ and re-charging capacitor 792, then $V_2$ and $V_3$ will exhibit slower transient response times, which may be offset in part by using higher capacitance filter capacitors 793 and 794. Alternatively comparator 797 can be time multiplexed to monitor both $V_1$ and $V_2$ outputs on a sample rather than a continuous basis. The approach where an algorithm constantly or frequently requests physical information, in this case the charge pump's output voltages, on a regular basis is known as a "polled" system.

Figure 21:
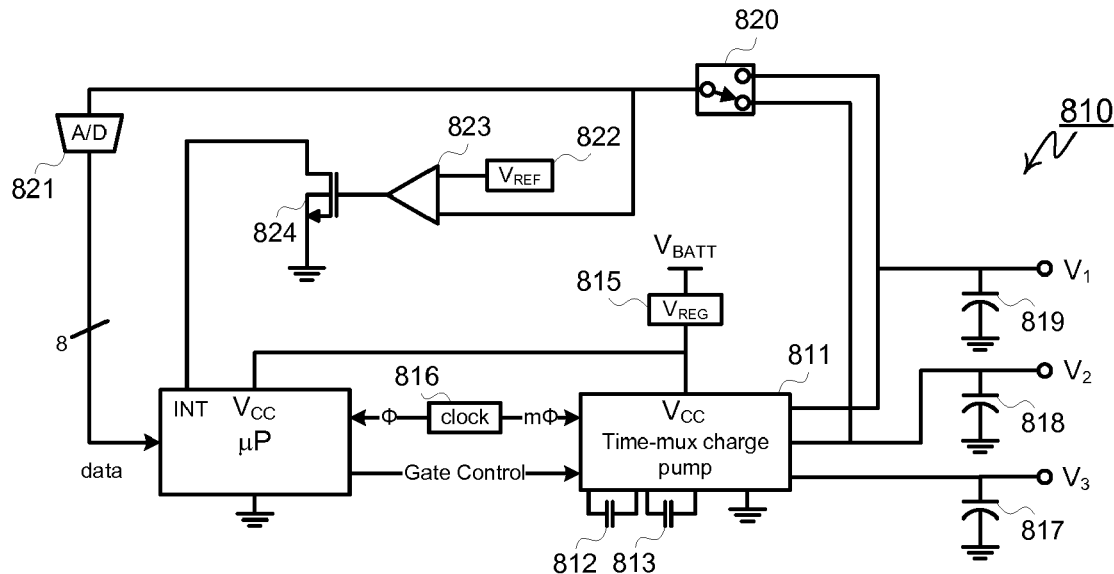
FIG. 21 is a block diagram of a digitally controlled multi-output charge pump.

Since many of the algorithms described contain "if-then-else" decisions, another option is to implement the priority hierarchy and multiplexing algorithm using firmware implemented in a microprocessor based system. FIG. 21 illustrates system 810 including a microprocessor or microcontroller 814, time-multiplexed-capacitor charge pump 811 with capacitors 812 and 813, voltage regulator 815, output capacitors 819, 818 and 817 corresponding to outputs $V_1$, $V_2$ and $V_3$ respectively, clock 816, analog multiplexer 820, analog-to-digital converter 821 and interrupt generation circuit comprising comparator 623, voltage reference 822, and N-channel MOSFET 824.

Basic operation of triple output charge pump 811 remains under the control of microprocessor 814 which monitors the voltages on outputs $V_1$ and $V_2$ on a sample basis and adjusts the algorithm dynamically to improve transient response. Analog multiplexer facilitates monitoring two different outputs from one A/D converter 821 and to report the digital information into digital inputs of microprocessor 814. Both microprocessor 814 and charge pump 811 are powered from voltage regulator 815 and are synchronized to a common clock switching at frequencies $\phi$ and $m \cdot \phi$ respectively. The multiplier m can be 0.001 meaning the charge switches at a rate three orders-of-magnitude less than the processor.

The interrupt circuit reduces the overhead needed for monitoring the voltage conditions of $V_1$ and $V_2$ outputs. Rather than forcing the microprocessor to constantly monitor the output of A/D converter 821, comparator 823 generates an interrupt whenever $V_{mux}$, the sample of either $V_1$ or $V_2$ outputs, drops outside a specified range. By turning on MOSFET 824, the INT interrupt pin on the microprocessor is pulled down, and invokes an event-driven interrupt. Only during the interrupt service routine, does the microprocessor need to look at or analyze the output of A/D converter 821.

Figure 22:
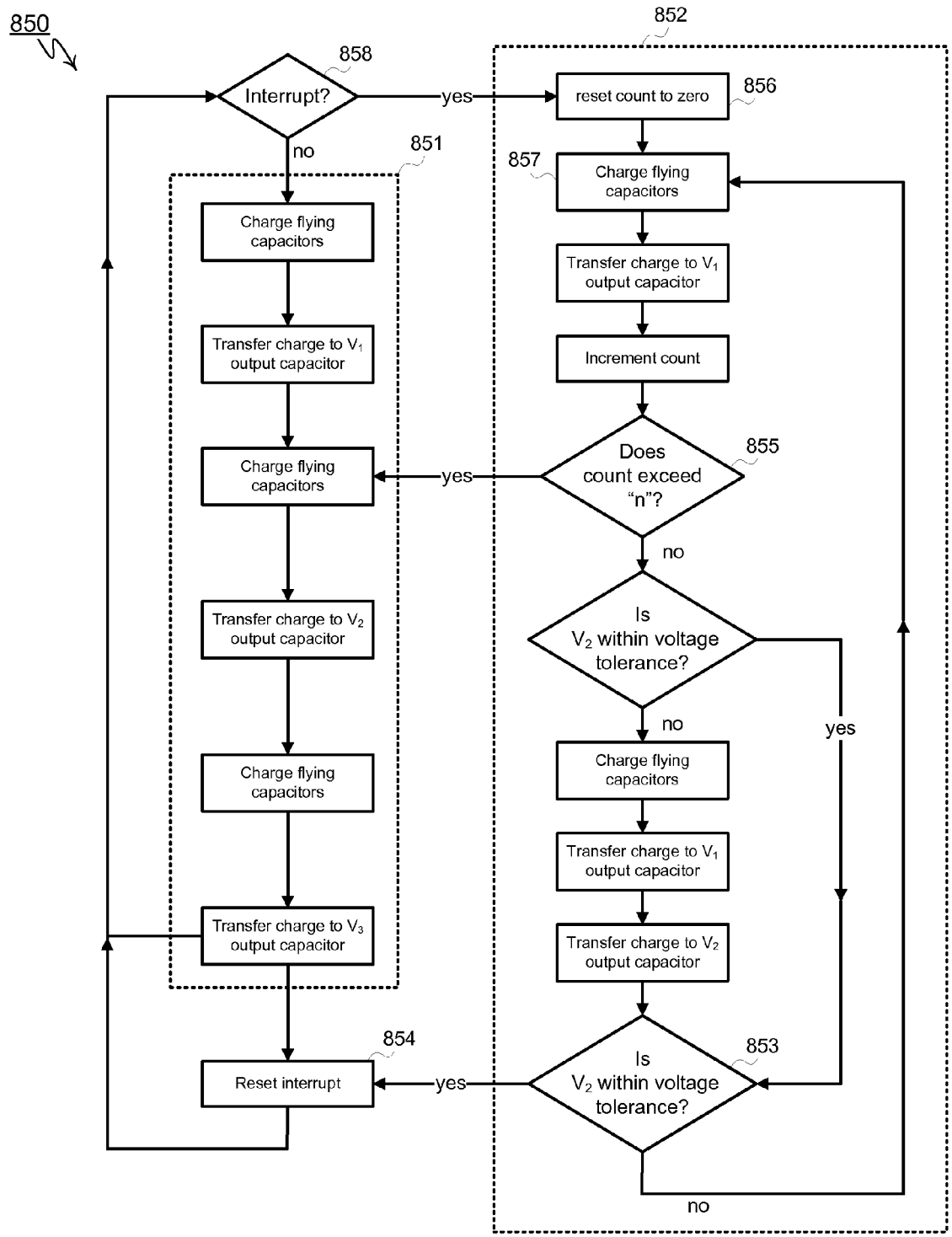
FIG. 22 is a flowchart showing a method for Interrupt driven digitally control of a multi-output charge pump.

The concept of an interrupt driven change in the control algorithm is illustrated in the exemplary flow chart 850 of FIG. 22. If no interrupt has occurred the charge pump operates according to the time-multiplexed-capacitor charge pump algorithm 851 described previously. If however, an INT interrupt occurs the program will jump to its ISR, i.e. its interrupt service routine 852. Once there it gives priority to the $V_1$ output by recharging its output then as needed it charges the $V_2$ output capacitor. Every loop of the ISR code, the flying capacitors charge output $V_1$ and optionally, charge output $V_2$ only as needed. When $V_1$ finally reaches its final tolerance range, conditional test 853 end the interrupt routine 852, clears the interrupt hardware 854 and reinitiates normal algorithm 851.

To prevent degradation of other regulated outputs other than the priority outputs $V_1$ and $V_2$ during the ISR routine 852, initiation of an interrupt clears a counter 856 and increments it by one each time through the loop as shown by operation 857. When the counter finally exceeds n times as determined by conditional 855, the algorithm jumps from the ISR loop 852 to charge $V_2$ and $V_3$ without resetting the interrupt. Once the charge transfer to $V_3$ has occurred the interrupt detect 858 will determine that $V_1$ is not yet compliant with its tolerance range and the converter will jump back to ISR tasks 852.

The algorithm can be adjusted in numerous ways depending on the mix of positive and negative supply voltages produced by the multiple output charge pump.

Regulating Multiple Charge-Pump Voltages; Charge pumps do not regulate voltage, but instead produce a time varying output that represents some fixed multiplier of the input voltage. The time-multiplexed-capacitor multiple output charge pump is no different in this regard. Moreover charge pumps are only efficient when the load voltage operates near the charge pump's n× multiple.

One common way to eliminate voltage variation in a charge pump's output is to combine it with a low drop-out linear regulator or LDO. Like conventional charge pumps, time-multiplexed-capacitor multiple output charge pump disclosed herein can also be combined with LDOs used to provide either pre-regulation to the charge pump, to provide post regulation, or both.

Figure 23A:
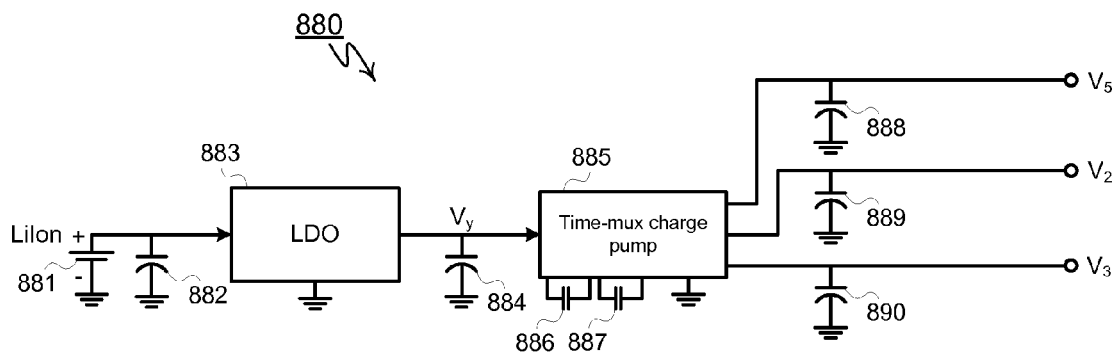
FIG. 23A is a block diagram of a digitally controlled multi-output charge pump with LDO pre-regulation.

For example in system 880 of FIG. 23A, LDO regulator 883 acts as a pre-regulator to time-multiplexed charge pump 885. The LDO regulates LiIon battery 881 to a constant intermediate voltage $V_y$ across filter capacitor 884 which is necessarily less than $V_{batt}$. The intermediate voltage Vy is then input into a single time-multiplexed charge pump to produce 885 with flying capacitors 886 and 887 to output three regulated outputs $V_1$, $V_2$ and $V_3$ with corresponding filter capacitors 888, 889, and 890. The output voltages are given by fixed fractional or integer multiples $n_1$, $n_2$, and $n_3$ by the relations:

$$V_1 = n_1 \cdot V_y$$

$$V_2 = n_2 \cdot V_y$$

$$V_3 = n_3 \cdot V_y$$

Multiples of n include −2×, −1×, −0.5×, +0.5×, +1.5×, +2×, and +3×. For a lithium ion battery $V_y$ is likely 3V or 2.7V in order to maximize operation over the full battery discharge life of 4.2V down to 3V.

Figure 23B:
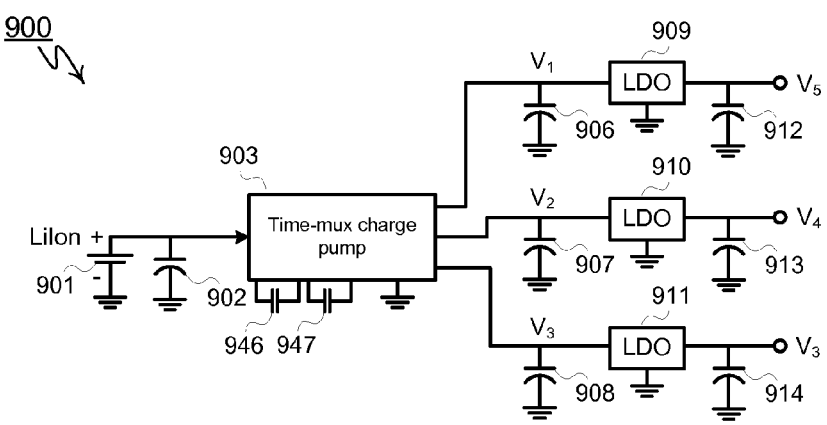
FIG. 23B is a block diagram of a digitally controlled multi-output charge pump with LDO post-regulation.

In an alternative embodiment, system 900 of FIG. 23B includes an un-regulated charge pump 903 with a time varying input voltage $V_{batt}$ from battery 901. The time-multiplexed charge pump 903 with flying capacitors 904 and 905 produces three un-regulated outputs $V_1$, $V_2$ and $V_3$ with corresponding filter capacitors 906, 907, and 908. These voltages act as inputs to LDOs 909, 910, and 911 to produce outputs $V_5$, $V_6$ and $V_7$ with corresponding filter capacitors 912, 913, and 914.

While the intermediate voltages $V_1$, $V_2$ and $V_3$ are given by fixed fractional or integer multiples $n_1$, $n_2$, and $n_3$, the output voltages $V_5$, $V_6$ and $V_7$ are determined by the LDO circuit and not the charge pump with one caveat, that the LDO's input must be higher than its output. In other words, the voltages the input to LDO 909 must be higher than its output so that $V_1 > V_5$, the input to LDO 910 must be higher than its output so that $V_2 > V_6$, and the input to LDO 911 must be higher than its output so that $V_3 > V_7$.

Figure 23C:
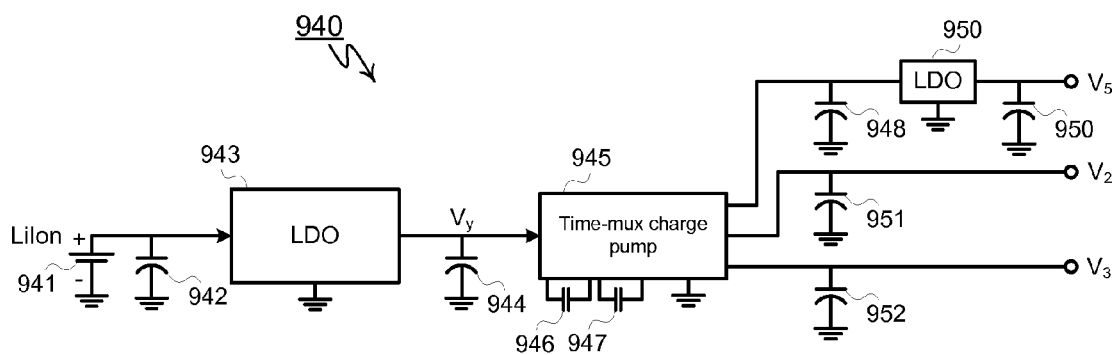
FIG. 23C is a block diagram of a digitally controlled multi-output charge pump with pre and post regulation.

In some instances not every output needs dedicated regulation. One solution to that scenario shown in schematic 940 of FIG. 23C is to utilize a single LDO 943 as a pre-regulator, a time-multiplexed-capacitor charge pump 945 to produce multiple output supplies $V_1$, $V_2$ and $V_3$ with corresponding filter capacitors 948, 951 and 952 and then to selectively post regulate certain outputs as need be. In this example LDO 949 is used to regulate voltage $V_1$ to a lower voltage $V_5$ filtered by capacitor 950.

As another embodiment of this invention, a time-multiplexed-capacitor charge pump can produce multiple independent outputs having the same voltage. Such a need arises when the same supply voltage is used for multiple purposes, e.g. for power, digital, analog and RF circuitry. To avoid noise and interference the supplies can be separated. For example, in circuits 880, 900 or 940, it is possible for $V_1 = V_2$ while $V_1 \neq V_3$ using the disclosed time-multiplexing charge pump methods described herein.

Figure 13B:
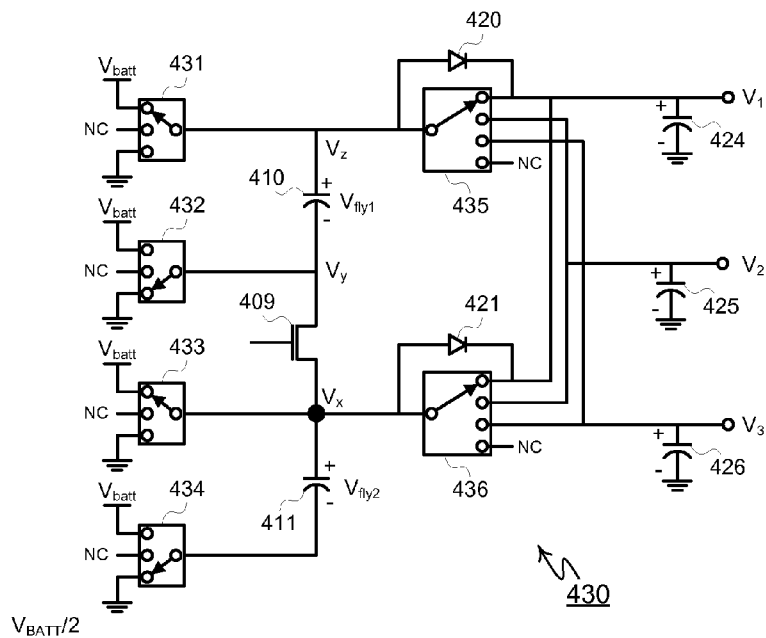
FIG. 13B is an equivalent circuit for the charge pump of FIG. 13A showing multiplexer operation.

For example in FIG. 13A and 13B, after charging each capacitor to a voltage $V_{batt}$, the charge transfer from flying capacitors 410 and 411 to the outputs $V_1$ and to $V_2$ could both be configured in the 2×, or doubler, mode. Referring to FIG. 15B, MOSFETs 405 and 407 connect the negative terminals of flaying capacitors 410 and 411 to positive terminal of the battery, so that $V_w = V_y = V_{batt}$. Turning on MOSFETs 413 and 416, routes the charge from flying capacitors 410 and 411 to output capacitor 425 and $V_2$. If instead, MOSFETs 412 and 415 were turned on, the charge would be routed to output capacitor 424 and $V_1$.

So by successively charging the outputs $V_1$ and $V_2$ with the same bias, two independent outputs operating of the same voltage can generated, so that $V_1 = V_{batt}$ and $V_2 = V_{batt}$ but $V_1$ and $V_2$ are completely independent supplies.

What is claimed is:
1. A multiple output charge pump that comprises:
 a flying capacitor;
 a first output node;
 a second output node; and
 a switching network, the switching network configured to provide the following modes of circuit operation:
 a first mode where the positive electrode of the flying capacitor is connected to an input voltage and the negative electrode of the flying capacitor is connected to ground;
 a second mode where the negative electrode of the flying capacitor is connected to the input voltage and the positive electrode of the flying capacitor is connected to the first output node; and a third mode where the positive electrode of the flying capacitor is connected to ground and the negative electrode of the flying capacitor is connected to the second output node.

2. A multiple output charge pump as recited in claim 1 that further comprises:
   a first MOSFET connected between the positive electrode of the flying capacitor and the input voltage;
   a second MOSFET connected between the negative electrode of the flying capacitor and ground;
   a third MOSFET connected between the positive electrode of the flying capacitor and the first output node; and
   a fourth MOSFET connected between the negative electrode of the flying capacitor and the second output node.

3. A multiple output charge pump as recited in claim 2 that further comprises a control circuit that drives the first, second, third and fourth MOSFETs so that the first, second and third modes are selected in a repeating sequence.

4. A multiple output charge pump as recited in claim 3 in which the repeating sequence has the form: first mode, second mode, first mode, third mode.

5. A multiple output charge pump as recited in claim 3 in which the repeating sequence has the form: first mode, second mode, third mode.

6. A multiple output charge pump that comprises:
   a first flying capacitor;
   a second flying capacitor;
   a first output node;
   a second output node; and
   a switching network, the switching network configured to provide the following modes of circuit operation:
   a first mode where the first and second flying capacitors are connected in series with the positive electrode of the first flying capacitor connected to an input voltage and the negative electrode of the second flying capacitor is connected to ground;
   a second mode where the negative electrodes of the flying capacitors are connected to the input voltage and the positive electrodes of the flying capacitors are connected to the first output node; and
   a third mode where the positive electrodes of the flying capacitors are connected to ground and the negative electrodes of the flying capacitors are connected to the second output node.

7. A multiple output charge pump as recited in claim 6 that further comprises a control circuit that drives the switching network so that the first, second and third modes are selected in a repeating sequence.

8. A multiple output charge pump as recited in claim 7 in which the repeating sequence has the form: first mode, second mode, first mode, third mode.

9. A multiple output charge pump as recited in claim 7 in which the repeating sequence has the form: first mode, second mode, third mode.

10. A multiple output charge pump that comprises:
    a first flying capacitor;
    a second flying capacitor;
    a first output node;
    a second output node; and
    a switching network, the switching network configured to provide the following modes of circuit operation:
    a first mode where the first and second flying capacitors are connected in series with the positive electrode of the first flying capacitor connected to an input voltage and the negative electrode of the second flying capacitor is connected to ground;
    a second mode where the negative electrodes of the flying capacitors are connected to the input voltage and the positive electrodes of the flying capacitors are connected to the first output node; and
    a third mode where the negative electrodes of the flying capacitors are connected to ground and the positive electrodes of the flying capacitors are connected to the second output node.

11. A multiple output charge pump as recited in claim 10 that further comprises a control circuit that drives the switching network so that the first, second and third modes are selected in a repeating sequence.

12. A multiple output charge pump as recited in claim 11 in which the repeating sequence has the form: first mode, second mode, first mode, third mode.

13. A multiple output charge pump as recited in claim 11 in which the repeating sequence has the form: first mode, second mode, third mode.

14. A multiple output charge pump that comprises:
    a first flying capacitor;
    a second flying capacitor;
    a first output node;
    a second output node; and
    a switching network, the switching network configured to provide the following modes of circuit operation:
    a first mode where the first and second flying capacitors are connected in series with the positive electrode of the first flying capacitor connected to an input voltage and the negative electrode of the second flying capacitor is connected to ground;
    a second mode where the positive electrodes of the flying capacitors are connected to ground and the negative electrodes of the flying capacitors are connected to the first output node; and
    a third mode where the first and second flying capacitors are connected in series with the positive electrode of the first flying capacitor connected to ground and the negative electrode of the second flying capacitor is connected to the second output node.

15. A multiple output charge pump as recited in claim 14 that further comprises a control circuit that drives the switching network so that the first, second and third modes are selected in a repeating sequence.

16. A multiple output charge pump as recited in claim 15 in which the repeating sequence has the form: first mode, second mode, first mode, third mode.

17. A multiple output charge pump as recited in claim 15 in which the repeating sequence has the form: first mode, second mode, third mode.

18. A multiple output charge pump that comprises:
    a first flying capacitor;
    a second flying capacitor;
    a first output node;
    a second output node;
    a third output node; and
    a switching network, the switching network configured to provide the following modes of circuit operation:
    a first mode where the flying capacitors are connected in series or in parallel between an input voltage ($V_{IN}$) and ground to allow the flying capacitors to be charged to any of the following voltages: $V_{IN}$, $-V_{IN}$, $\frac{1}{2} V_{IN}$, $-\frac{1}{2} V_{IN}$; and
    a second mode where the first and second flying capacitors are connected in series with the negative electrode of the second flying capacitor connected to the input voltage and the positive electrode of the first flying capacitor is connected to the first output node; and a third mode where the negative electrodes of the flying capacitors are connected to the input voltage and the positive electrodes of the flying capacitors are connected to the second output node.

19. A multiple output charge pump as recited in claim 18 that further comprises
a fourth mode where the positive electrode of the first flying capacitor is connected to ground and the negative electrodes of the first flying capacitor is connected to the third output node.

20. A multiple output charge pump as recited in claim 18 that further comprises
a fourth mode where the negative electrodes of the flying capacitors are connected to ground and the positive electrodes of the flying capacitors are connected to the third output node.

21. A charge pump that comprises:
a first flying capacitor;
a second flying capacitor;
a first output node;
a second output node;
a third output node; and
a switching network, the switching network configured to provide the following modes of circuit operation:
a first mode where the flying capacitors are connected in series or in parallel between an input voltage ($V_{IN}$) and ground to allow the flying capacitors to be charged to any of the following voltages: $V_{IN}$, $-V_{IN}$, ½ $V_{IN}$, $-½ V_{IN}$; and
a second mode where the positive electrodes of the flying capacitors are connected to ground and the negative electrodes of the flying capacitors are connected to the first output node; and
a third mode where the first and second flying capacitors are connected in series with the positive electrode of the second flying capacitor connected to ground and the negative electrode of the first flying capacitor is connected to the second output node.

22. A method for operating a multiple output charge pump which includes a flying capacitor, a first output node and a second output node, the method comprising:
configuring a switching network so that the charge pump operates in a first mode where the positive electrode of the flying capacitor is connected to an input voltage and the negative electrode of the flying capacitor is connected to ground;
configuring the switching network so that the charge pump operates in a second mode where the negative electrode of the flying capacitor is connected to the input voltage and the positive electrode of the flying capacitor is connected to the first output node; and
configuring the switching network so that the charge pump operates in a third mode where the positive electrode of the flying capacitor is connected to ground and the negative electrode of the flying capacitor is connected to the second output node.

23. A method for operating a multiple output charge pump which includes a first flying capacitor, a second flying capacitor, a first output node and a second output node, the method comprising:
configuring a switching network so that the charge pump operates in a first mode where the first and second flying capacitors are connected in series with the positive electrode of the first flying capacitor connected to an input voltage and the negative electrode of the second flying capacitor is connected to ground;
configuring the switching network so that the charge pump operates in a second mode where the negative electrodes of the flying capacitors are connected to the input voltage and the positive electrodes of the flying capacitors are connected to the first output node; and
configuring the switching network so that the charge pump operates in a third mode where the positive electrodes of the flying capacitors are connected to ground and the negative electrodes of the flying capacitors are connected to the second output node.

24. A method for operating a multiple output charge pump which includes a first flying capacitor, a second flying capacitor, a first output node and a second output node, the method comprising:
configuring a switching network so that the charge pump operates in a first mode where the first and second flying capacitors are connected in series with the positive electrode of the first flying capacitor connected to an input voltage and the negative electrode of the second flying capacitor is connected to ground;
configuring the switching network so that the charge pump operates in a second mode where the positive electrodes of the flying capacitors are connected to ground and the negative electrodes of the flying capacitors are connected to the first output node; and
configuring the switching network so that the charge pump operates in a third mode where the first and second flying capacitors are connected in series with the positive electrode of the first flying capacitor connected to ground and the negative electrode of the second flying capacitor is connected to the second output node.

25. A method for operating a multiple output charge pump which includes a first flying capacitor, a second flying capacitor, a first output node, a second output node and a third output node, the method comprising:
configuring a switching network so that the charge pump operates in a first mode where the flying capacitors are connected in series or in parallel between an input voltage ($V_{IN}$) and ground to allow the flying capacitors to be charged to any of the following voltages: $V_{IN}$, $-V_{IN}$, ½ $V_{IN}$, $-½ V_{IN}$; and
configuring the switching network so that the charge pump operates in a second mode where the first and second flying capacitors are connected in series with the negative electrode of the second flying capacitor connected to the input voltage and the positive electrode of the first flying capacitor is connected to the first output node; and
configuring the switching network so that the charge pump operates in a third mode where the negative electrodes of the flying capacitors are connected to the input voltage and the positive electrodes of the flying capacitors are connected to the second output node.

26. A charge pump as recited in claim 25 that further comprises
configuring the switching network so that the charge pump operates in a fourth mode where the positive electrode of the first flying capacitor is connected to ground and the negative electrodes of the first flying capacitor is connected to the third output node.

27. A charge pump as recited in claim 25 that further comprises
configuring the switching network so that the charge pump operates in a fourth mode where the negative electrodes of the flying capacitors are connected to ground and the positive electrodes of the flying capacitors are connected to the third output node.

28. A method for operating a multiple output charge pump which includes a first flying capacitor, a second flying capacitor, a first output node, a second output node and a third output node, the method comprising:

configuring a switching network so that the charge pump operates in a first mode where the flying capacitors are connected in series or in parallel between an input voltage ($V_{IN}$) and ground to allow the flying capacitors to be charged to any of the following voltages: $V_{IN}$, $-V_{IN}$, $\frac{1}{2} V_{IN}$, $-\frac{1}{2} V_{IN}$; and configuring the switching network so that the charge pump operates in a second mode where the positive electrodes of the flying capacitors are connected to ground and the negative electrodes of the flying capacitors are connected to the first output node; and configuring the switching network so that the charge pump operates in a third mode where the first and second flying capacitors are connected in series with the positive electrode of the second flying capacitor connected to ground and the negative electrode of the first flying capacitor is connected to the second output node.

* * * * *

UNITED STATES PATENT AND TRADEMARK OFFICE
CERTIFICATE OF CORRECTION

PATENT NO. : 8,310,218 B2
APPLICATION NO. : 11/835760
DATED : November 13, 2012
INVENTOR(S) : Richard K. Williams It is certified that error appears in the above-identified patent and that said Letters Patent is hereby corrected as shown below:

In the Claims:

Column 30, Claim 26, Lines 54-55, replace "A charge pump as recited in claim 25 that further comprises" with --The method of claim 25 further comprising--.

Column 30, Claim 27, Lines 61-62, replace "A charge pump as recited in claim 25 that further comprises" with --The method of claim 25 further comprising--.

Signed and Sealed this
Twenty-second Day of October, 2013

Teresa Stanek Rea
*Deputy Director of the United States Patent and Trademark Office*